(12) United States Patent
Ko

(10) Patent No.: US 11,373,043 B2
(45) Date of Patent: Jun. 28, 2022

(54) TECHNIQUE FOR GENERATING AND UTILIZING VIRTUAL FINGERPRINT REPRESENTING TEXT DATA

(71) Applicant: SEJIN MIND INC., Seoul (KR)

(72) Inventor: Kyung Pyo Ko, Seoul (KR)

(73) Assignee: SEJIN MIND INC., Seoul (KR)

( * ) Notice: Subject to any disclaimer, the term of this patent is extended or adjusted under 35 U.S.C. 154(b) by 178 days.

(21) Appl. No.: 16/760,003

(22) PCT Filed: Dec. 28, 2017

(86) PCT No.: PCT/KR2017/015627
§ 371 (c)(1),
(2) Date: Apr. 28, 2020

(87) PCT Pub. No.: WO2019/098454
PCT Pub. Date: May 23, 2019

(65) Prior Publication Data
US 2020/0349323 A1    Nov. 5, 2020

(30) Foreign Application Priority Data

Nov. 15, 2017  (KR) .......................... 10-2017-0152299

(51) Int. Cl.
*G06F 17/00* (2019.01)
*G06F 40/289* (2020.01)
(Continued)

(52) U.S. Cl.
CPC .......... *G06F 40/289* (2020.01); *G06N 3/088* (2013.01); *G06V 30/414* (2022.01)

(58) Field of Classification Search
CPC ...... G06F 40/289; G06F 40/279; G06F 16/00; G06F 16/38; G06N 3/088; G06N 3/0445;
(Continued)

(56) References Cited

U.S. PATENT DOCUMENTS 8,910,037 B1   12/2014  Spasojevic et al.
9,679,554 B1    6/2017  Czuczman et al.
(Continued)

FOREIGN PATENT DOCUMENTS

CN    105589962 A    5/2016
KR    101769918 B1   8/2017

OTHER PUBLICATIONS

Karakasidis, Alexandros, and Vassilios S. Verykios. "Privacy preserving record linkage using phonetic codes." 2009 Fourth Balkan Conference in Informatics. IEEE, 2009 (Year: 2009).*

(Continued)

*Primary Examiner* — Andrew T McIntosh
(74) *Attorney, Agent, or Firm* — Innovation Capital Law Group, LLP; Vic Lin

(57) ABSTRACT

According to an embodiment of a present disclosure, a method for generating and utilizing a text fingerprint performed by a computing device is disclosed. The method comprises the steps of: dividing text data into one or more segments based on a predetermined text segmentation algorithm; determining a mapping value assigned to one or more subsegments that form the divided segment based on a predetermined mapping algorithm; generating a coordinate value for each of the one or more segments based on the determined mapping value; and generating the virtual fingerprint having a phonetic feature for the text data based on the generated coordinate value. That is, whether a plurality of the text data are similar to each other can be easily determined, when the text data also has a unique virtual fingerprint based on a pronunciation, in the same way every person has a unique fingerprint.

19 Claims, 14 Drawing Sheets

(51) Int. Cl.
*G06N 3/08* (2006.01)
*G06V 30/414* (2022.01)

(58) Field of Classification Search
CPC .... G06N 3/0481; G06N 3/0454; G06N 3/084; G06V 30/414; G06V 30/40
See application file for complete search history.

(56) References Cited

U.S. PATENT DOCUMENTS

| | | | |
|---|---|---|---|
| 10,438,083 B1* | 10/2019 | Rivard | G06V 10/424 |
| 2006/0173855 A1* | 8/2006 | Turner | H04L 67/1023 |
| 2010/0131272 A1* | 5/2010 | Wu | H04L 9/3236 |
| | | | 704/243 |
| 2012/0330947 A1* | 12/2012 | Huenemann | G06F 16/951 |
| | | | 707/728 |
| 2014/0259157 A1 | 9/2014 | Toma et al. | |
| 2016/0292145 A1 | 10/2016 | Azzi et al. | |
| 2017/0039211 A1* | 2/2017 | Pottinger | G06F 16/152 |

OTHER PUBLICATIONS

International Search Report dated Aug. 14, 2018 from PCT Application No. PCT/KR2017/015627.

* cited by examiner

[Fig. 1]
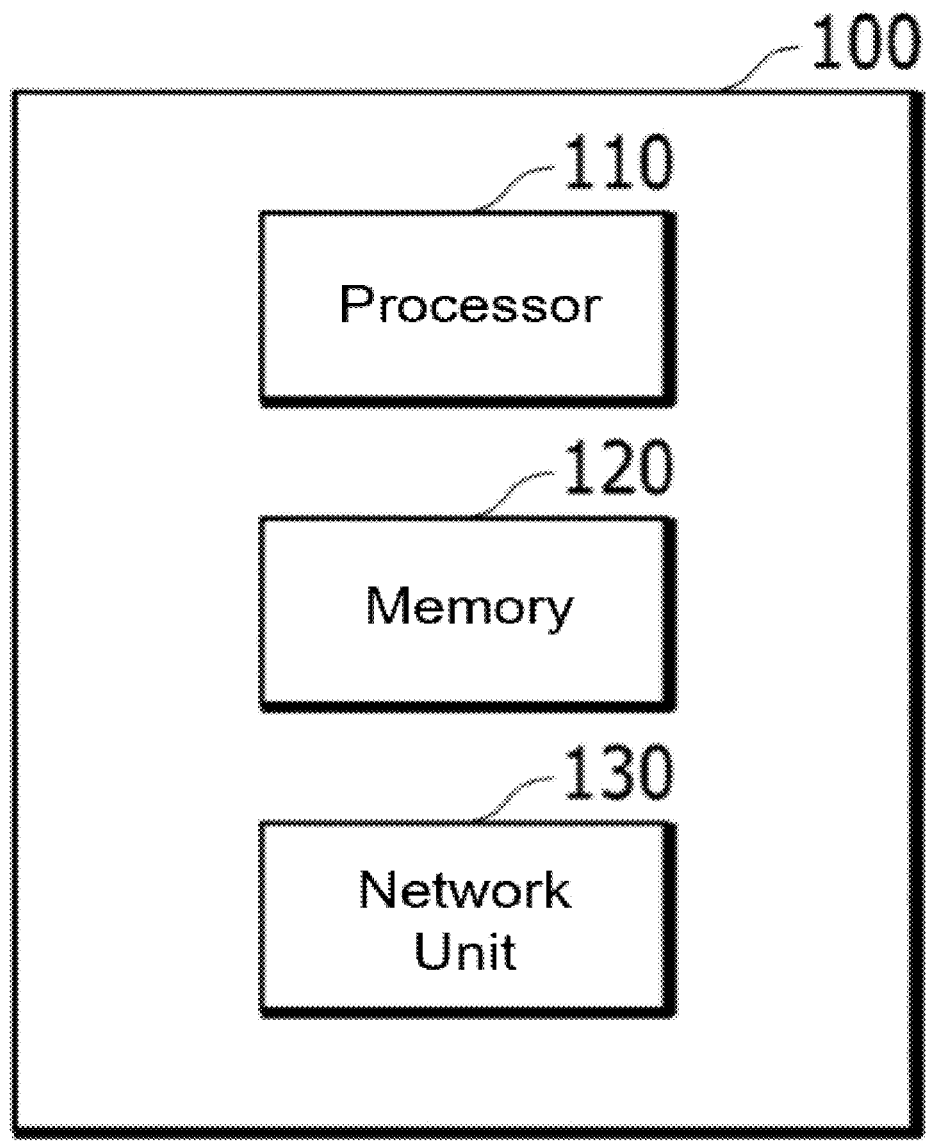

[Fig. 2]
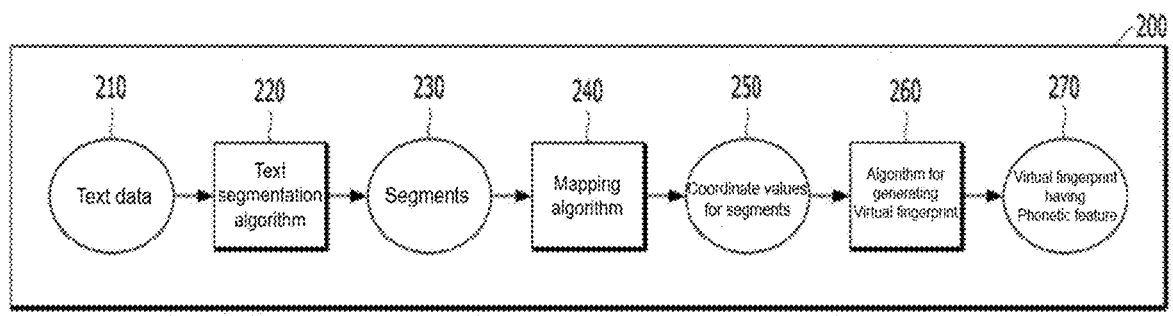

[Fig. 3]
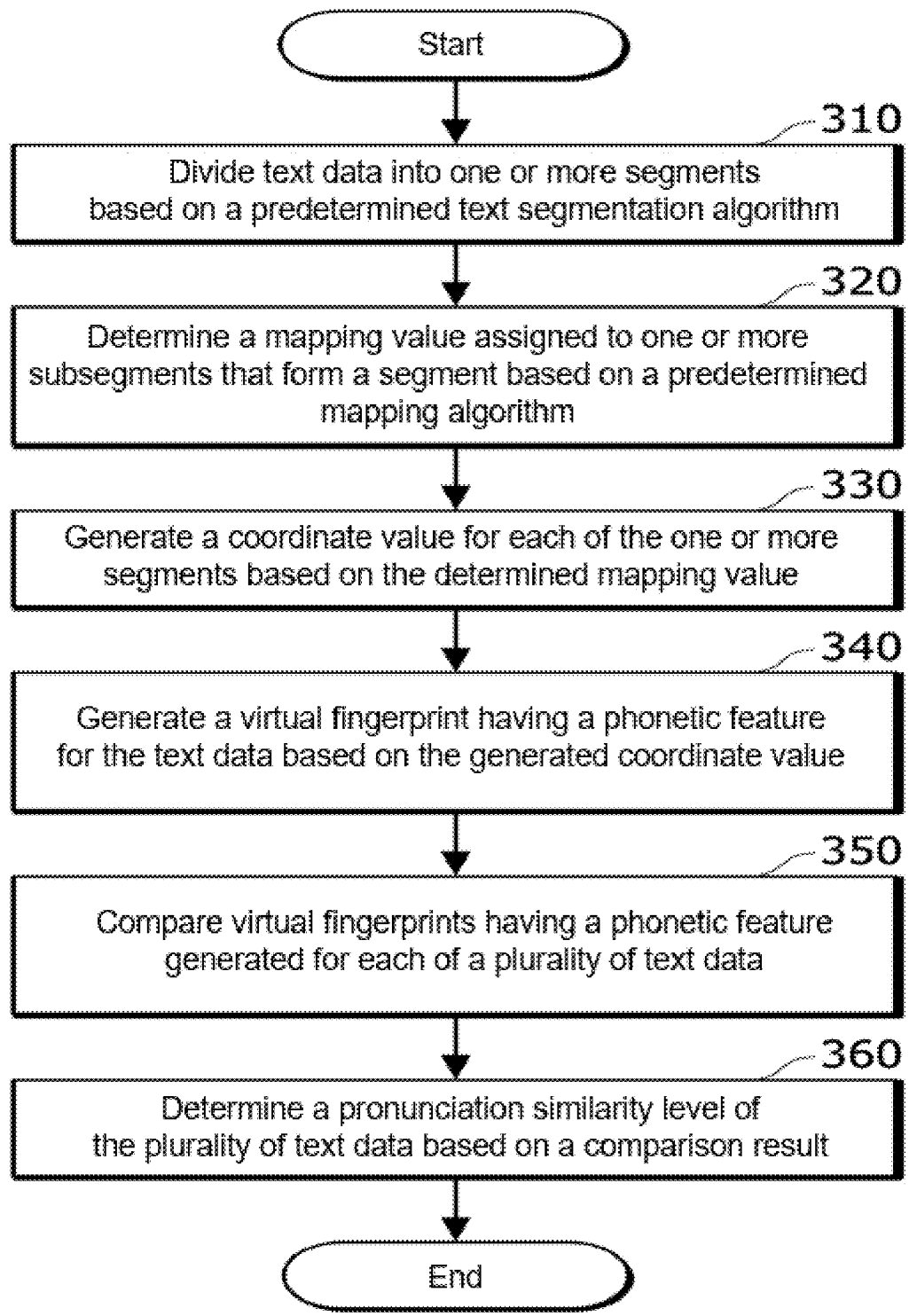

[Fig. 4]
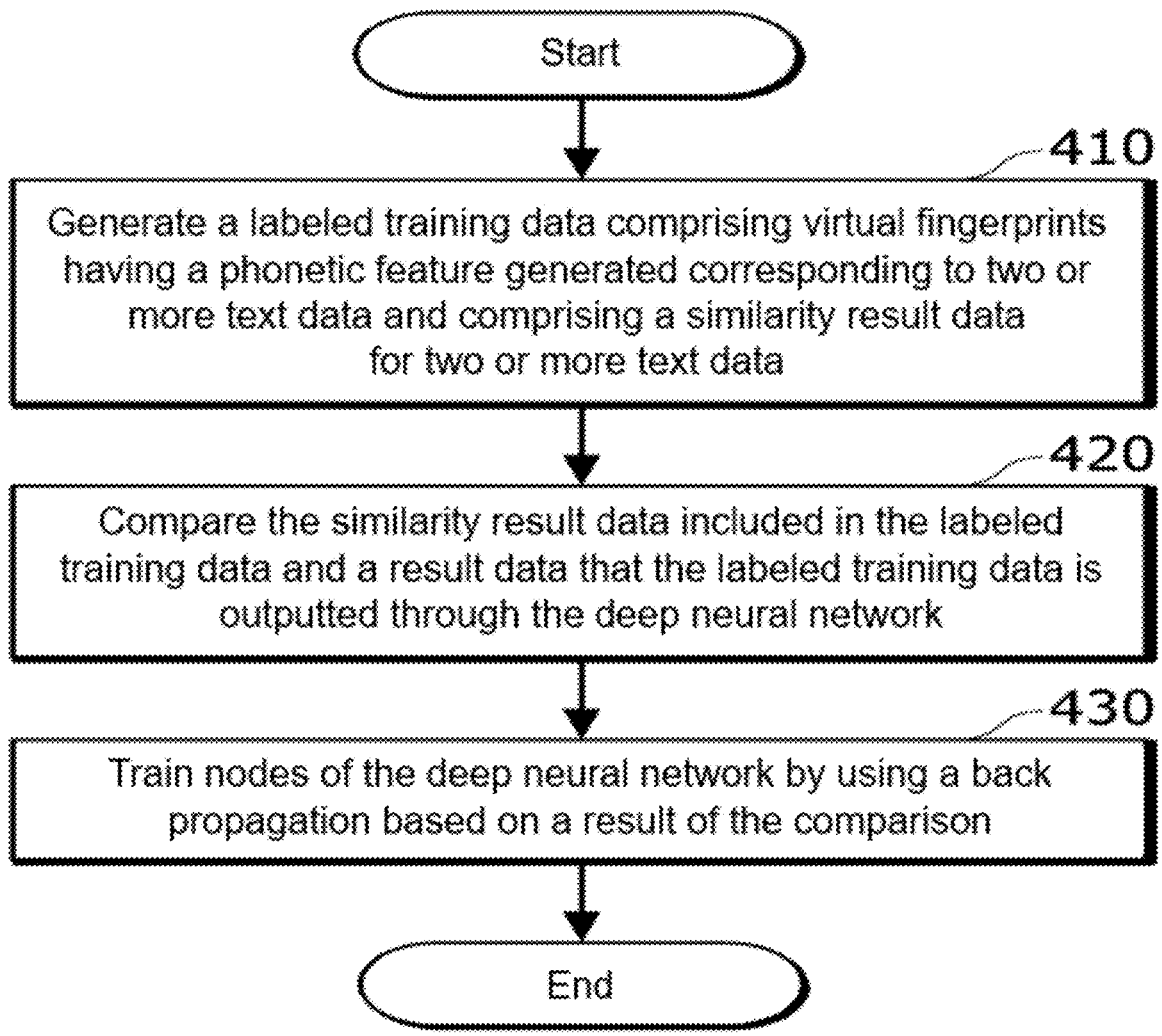

[Fig. 5]
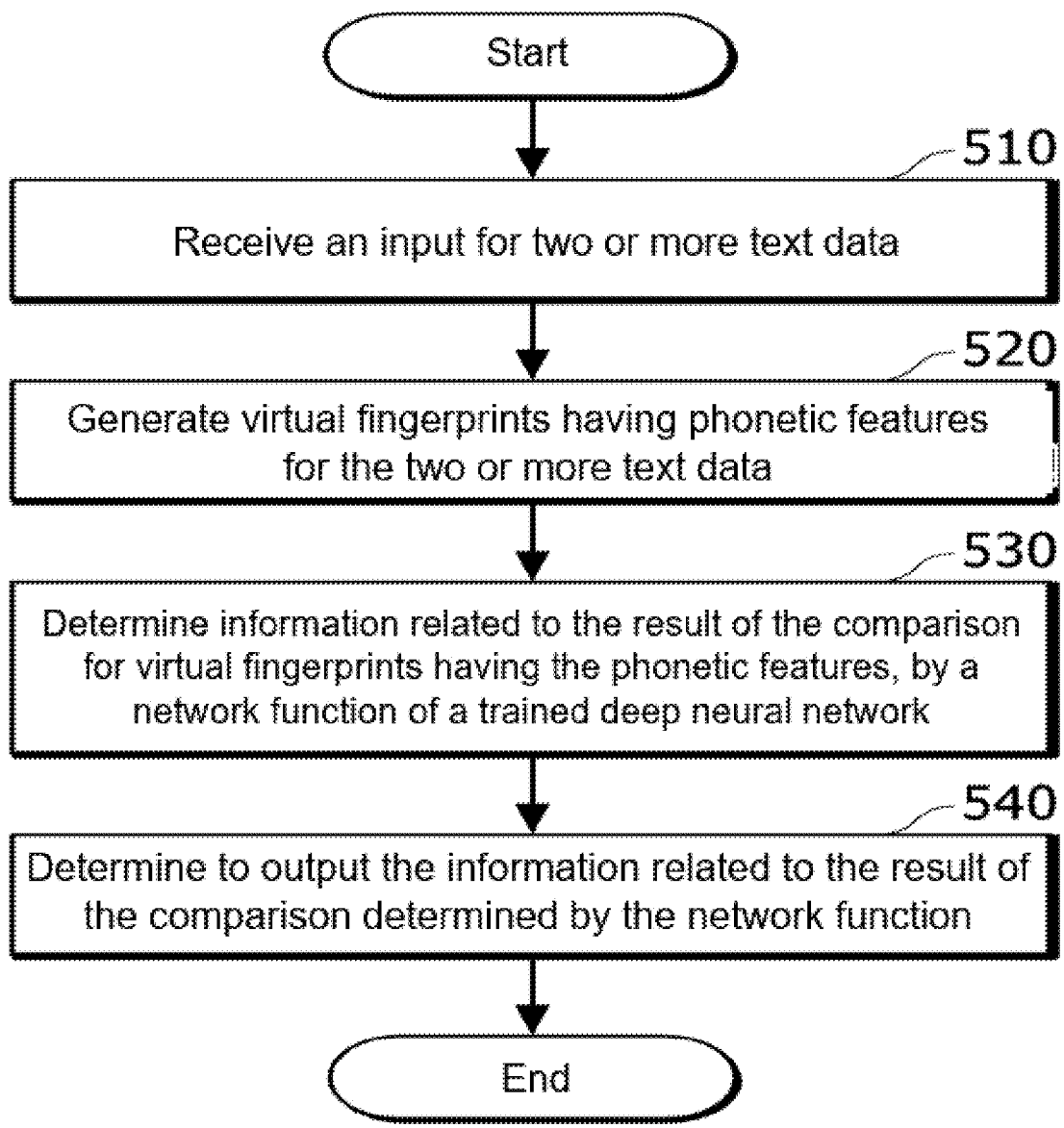

[Fig. 6b]
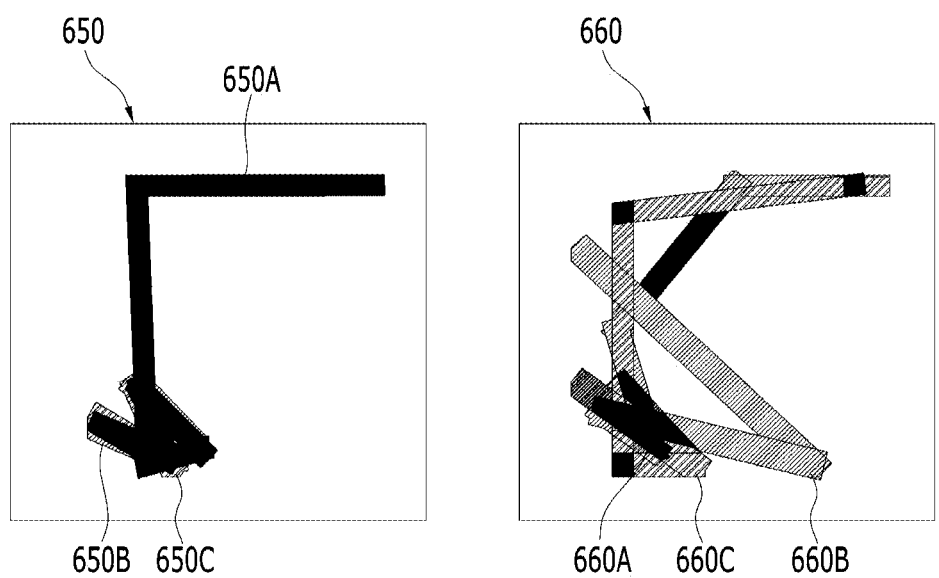

[Fig. 6c]
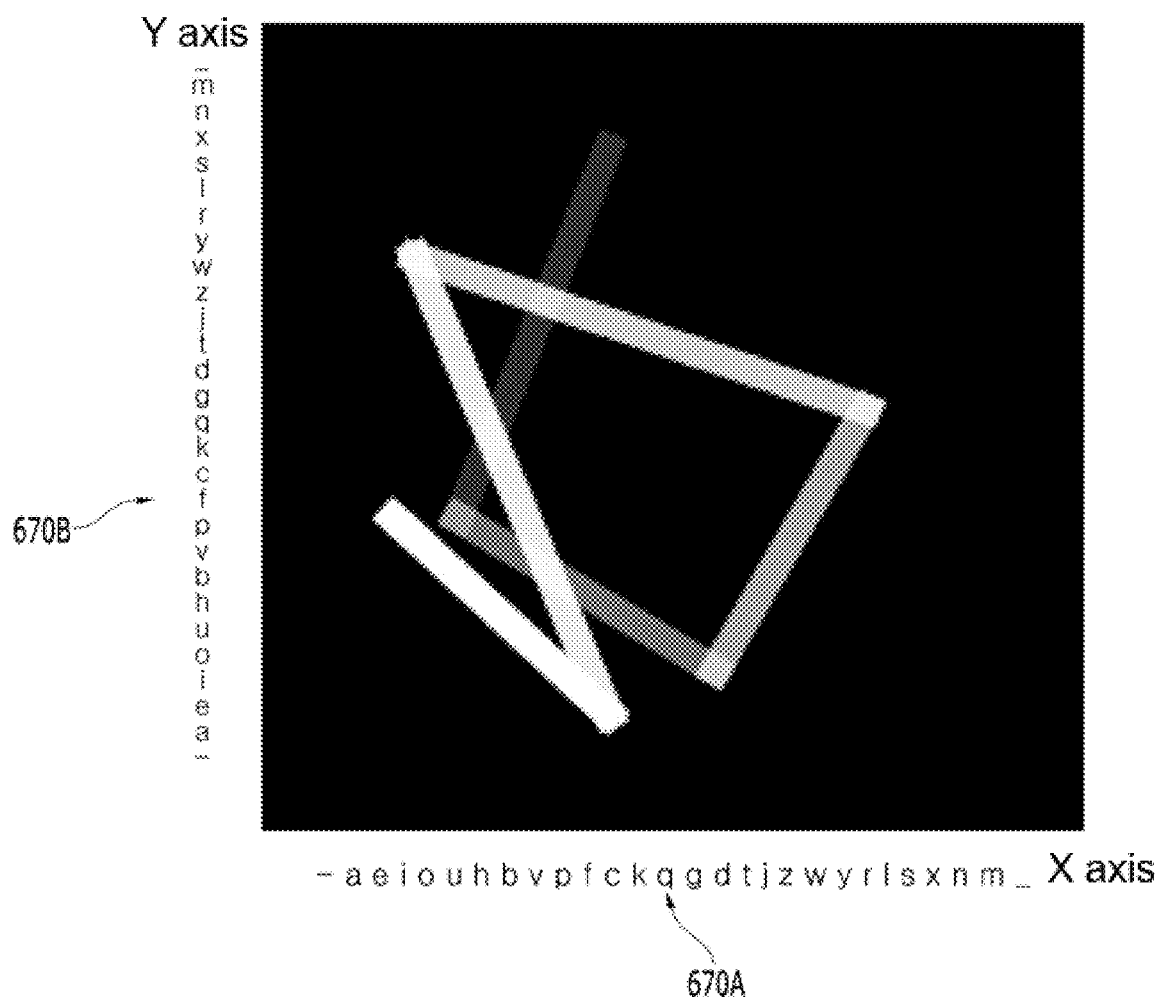

[Fig. 8]

[Fig. 10]
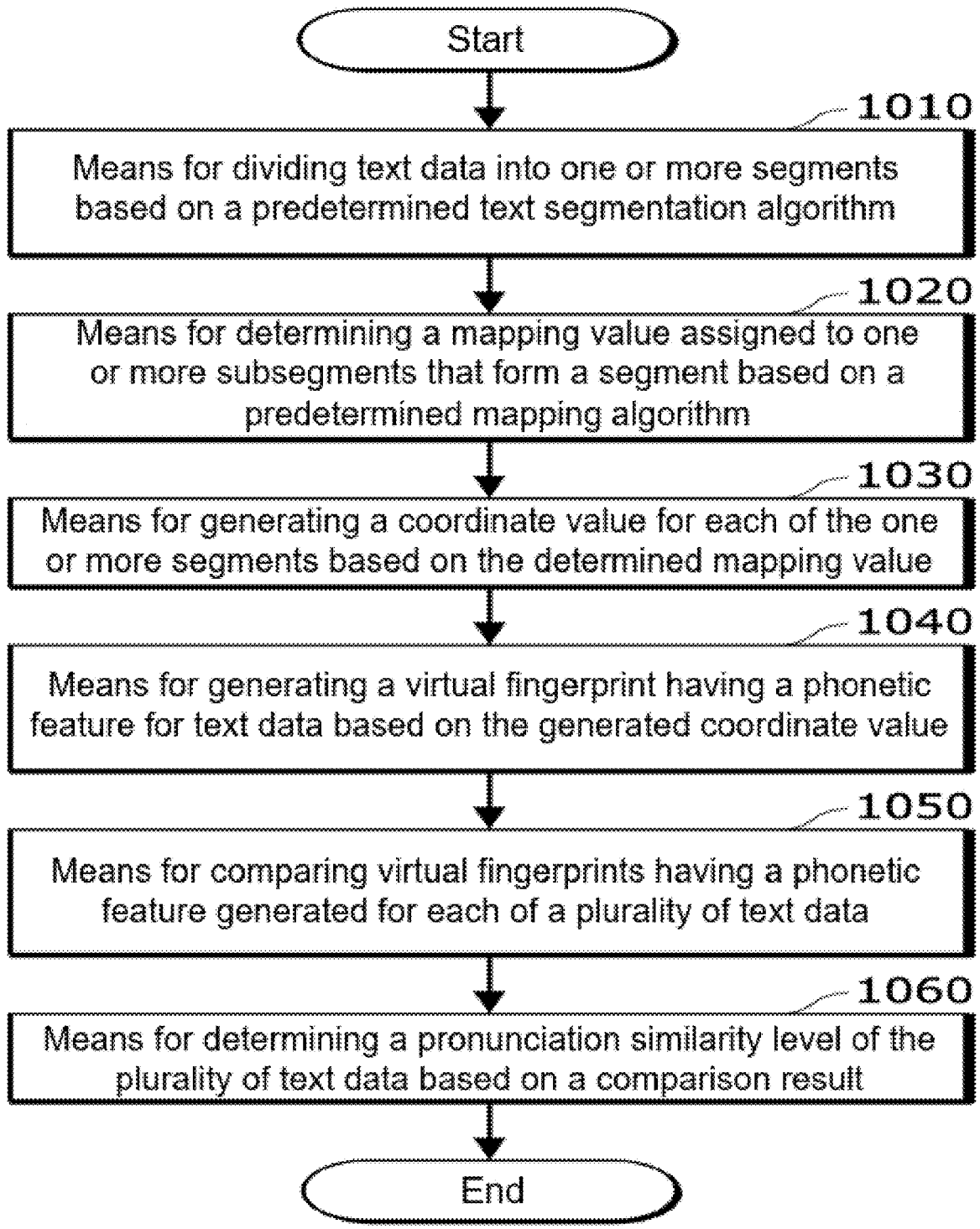

[Fig. 11]
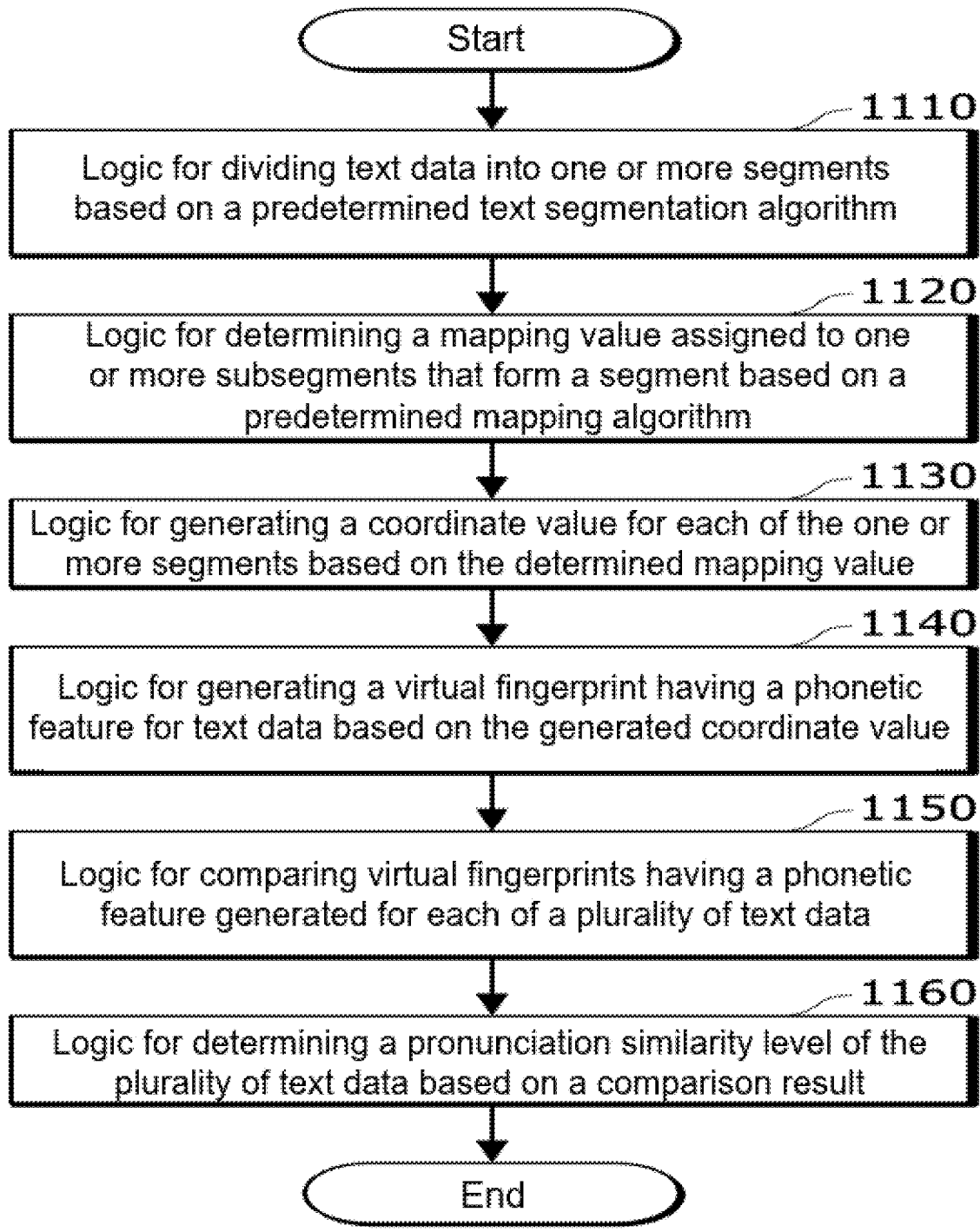

[Fig. 12]
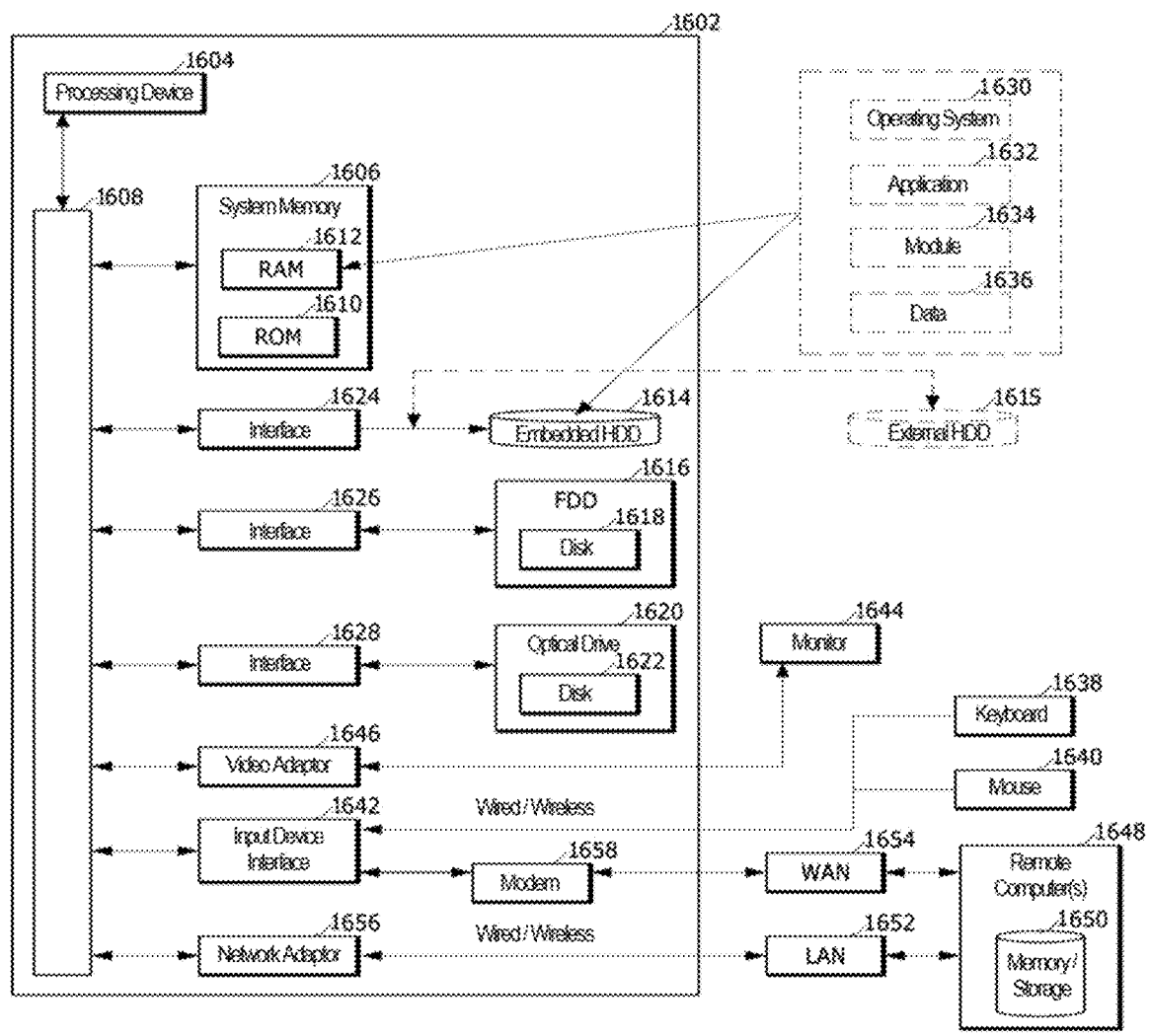

TECHNIQUE FOR GENERATING AND UTILIZING VIRTUAL FINGERPRINT REPRESENTING TEXT DATA

TECHNICAL FIELD

This application claims priority to and the benefit of Korean Patent Application No. 10-2017-0152299 filed in the Korean Intellectual Property Office on Nov. 15, 2017, the entire contents of which are incorporated herein by reference.

The present disclosure relates to a computer field, and more particularly, to processing of text data.

BACKGROUND

Machine learning is a modeling technique using data, and may be defined as a technique for training or finding a model by using a predetermined form of data. Data used in machine learning may be defined as training data, and the key concept of machine learning is that a computing device builds the desired model by utilizing the training data.

Deep learning may be defined as a set of machine learning algorithms attempting to achieve high-level abstraction (work of abstracting features, core contents or functions among a large amount of data or complex materials) through a combination of several non-linear transformation methods, and is one field of machine learning, which teaches a way of thinking of a person to a computer. Deep learning is used across industries with artificial intelligence which means intelligence created from machines.

The deep learning, which has attracted worldwide attention for years, is now the most important methodology in artificial intelligence and machine learning fields. The deep learning is the machine learning using Deep Neural Networks (DNN), and is a technique for finding a desired form of the model from data. Each layer of a neural network receives information extracted from a lower layer, and generates more abstracted information by using the received information and transmits the generated information to an upper layer. The neural network consisting of several layers may extract a very high-level feature through multiple abstractions. Since the high-level feature includes more information than low-level features and is resistant to variation, when recognition is performed by using the high-level feature, it is possible to obtain high and stable performance.

In the past, there were difficulties in using the DNN due to a theoretical problem, such as a diminishing gradient problem, and several problems, such as a difficulty in collecting training data and a limitation in calculation performance. Recently, according to the development of a new learning algorithm and the technology for processing large amounts of data, deep learning is showing great performance in various fields while overcoming the theoretical and realistic problems begin.

Particularly, a Convolutional Neural Network (CNN) is one of the deep learning methodologies in which a feature extraction step and a knowledge learning step are included in the deep learning algorithm and is currently evaluated to be highly useful in the field of classification algorithm.

The origin of the CNN is Neocognitron created by Fukushima in the 1980s by imitating the visual processing process of animals. Subsequently, in the 1990s, LeCun successfully applied the gradient-based learning algorithm, so that the CNN began to be widely used for practical problems. The performance of CNN has attracted the attention of many researchers, and accordingly research is being actively conducted to improve CNN or apply CNN to new problems. Based on the research results, attempts are being made to apply the CNN to various types of actual products and services.

Korean Patent No. 10-1769918 presents the deep learning-based recognition device for extracting text from an image.

SUMMARY

Technical Problem

The present disclosure is conceived according to the background art, and one of the various objects of the present disclosure is to generate a text fingerprint representing text data and utilize the generated text fingerprint in various forms.

Technical Solution

An exemplary embodiment of the present disclosure discloses a computer program stored in a computer-readable storage medium including encoded commands is stored. When the computer program is executed by one or more processors of a computer system, the computer program causes the one or more processors to perform a method for generating and utilizing a virtual fingerprint representing text data, and the method may include: dividing text data into one or more segments based on a predetermined text segmentation algorithm; determining a mapping value assigned to each of one or more subsegments forming the divided segment based on a predetermined mapping algorithm; generating a coordinate value for each of the one or more segments based on the determined mapping value, and generating a virtual fingerprint having a phonetic feature for the text data based on the generated coordinate value.

Another exemplary embodiment of the present disclosure discloses a computing device for implementing a method of generating and utilizing a text fingerprint. The computing device may include: one or more processors; and a memory storing commands executable in the one or more processors. The one or more processor may divide text data into one or more segments based on a predetermined text segmentation algorithm; determine a mapping value assigned to each of one or more subsegments forming the divided segment based on a predetermined mapping algorithm; generate a coordinate value for each of the one or more segments based on the determined mapping value; and generate a virtual fingerprint having a phonetic feature for the text data based on the generated coordinate value.

Another exemplary embodiment of the present disclosure discloses a method of generating and utilizing a text fingerprint performed by a computing device. The method may include dividing text data into one or more segments based on a predetermined text segmentation algorithm; determining a mapping value assigned to each of one or more subsegments forming the divided segment based on a predetermined mapping algorithm; generating a coordinate value for each of the one or more segments based on the determined mapping value, and generating a virtual fingerprint having a phonetic feature for the text data based on the generated coordinate value.

Advantageous Effects

According to one of the various effects of the present disclosure, a text fingerprint representing text data may be generated and utilized in various forms.

DESCRIPTION OF DRAWINGS

Some of the exemplary embodiments are illustrated in the accompanying drawings so that the above-mentioned characteristics of the contents of the present disclosure may be understood in detail with a more detailed description regarding the following exemplary embodiments. Further, the similar reference numerals in the drawing intend to designate the same or similar function throughout several aspects. However, the accompanying drawings simply illustrate specific typical exemplary embodiments of the contents of the present disclosure and are not considered to limit the scope of the present disclosure, and it is noted that other exemplary embodiments having the same effect may be sufficiently recognized.

FIG. 1 is a schematic diagram illustrating a computing device which represents text data in the form of a virtual fingerprint and utilizes the virtual fingerprint according to an exemplary embodiment of the present disclosure.

FIG. 2 is a flowchart illustrating an example of representing text data in the form of a virtual fingerprint according to the exemplary embodiment of the present disclosure.

FIG. 3 is a diagram illustrating an illustrative method of representing text data in the form of a virtual fingerprint and utilizing the virtual fingerprint according to the exemplary embodiment of the present disclosure.

FIG. 4 is a diagram illustrating an illustrative training process for text data represented in the form of a virtual fingerprint according to the exemplary embodiment of the present disclosure.

FIG. 5 is a diagram illustrating an illustrative method of comparing text data through a trained deep learning network according to the exemplary embodiment of the present disclosure.

FIG. 6B is a diagram illustrating an example of a method of comparing text data represented in the form of the virtual fingerprint according to the exemplary embodiment of the present disclosure.

FIG. 6C is a diagram illustrating an example of text data represented in the form of the virtual fingerprint according to the exemplary embodiment of the present disclosure.

FIG. 10 is a diagram illustrating an example of a means that represents text data in the form of a virtual fingerprint and utilizes the virtual fingerprint according to an exemplary embodiment of the present disclosure.

FIG. 11 is a diagram illustrating an example of logic which represents text data in the form of a virtual fingerprint and utilizes the virtual fingerprint according to an exemplary embodiment of the present disclosure.

FIG. 12 is a block diagram illustrating an example of a computing device according to an exemplary embodiment of the present disclosure.

DETAILED DESCRIPTION OF THE INVENTION

Figure 6A:
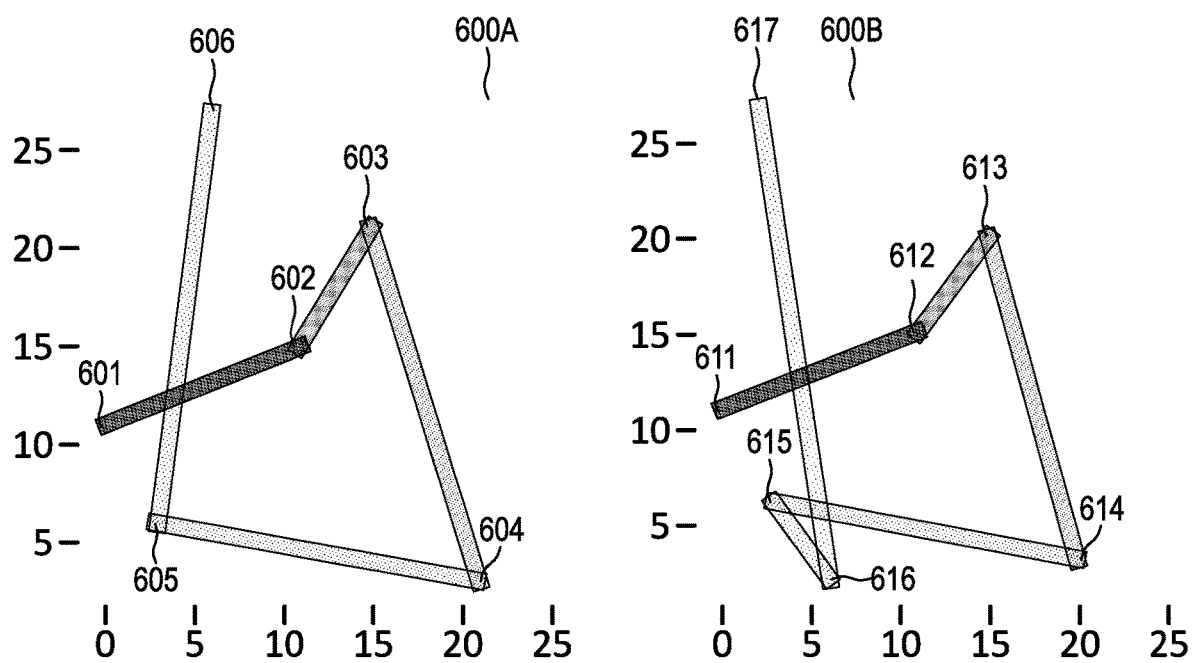
FIG. 6A is a diagram illustrating an example of text data represented in the form of a virtual fingerprint according to the exemplary embodiment of the present disclosure.

Various exemplary embodiments and/or aspects are now disclosed regarding the drawings. In the description below, the plurality of particular detailed matters are disclosed for helping general understanding of one or more aspects for description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof.

Further, various aspects and characteristics may be presented by a system that may include a plurality of devices, components, and/or modules. It shall also be understood and recognized that the point that various systems may include additional devices, components, and/or modules, and/or the point that the various systems may not include all of the devices, the components, the modules, and the like discussed about the drawings.

An "exemplary embodiment", an "example", an "aspect", an "illustration", and the like used in the present specification may not be construed to be better or have an advantage compared to a predetermined described aspect, an aspect having a different design, or designs. Terms, such as "component", "module", "system", and "interface" used below generally mean computer-related entities, and may mean, for example, hardware, a combination of hardware and software, and software.

Further, a term "or" intends to mean comprehensive "or", not exclusive "or". That is, unless otherwise specified or when it is unclear in context, "X uses A or B" intends to mean one of the natural comprehensive substitutions. That is when X uses A, X uses B, or X uses both A and B, "X uses A or B" may be applied to anyone among the cases. Further, a term "and/or" used in the present specification shall be understood to designate and include all of the possible combinations of one or more items among the listed relevant items.

Further, a term "include" and/or "including" means that a corresponding characteristic and/or a constituent element exists, but it shall be understood that the existence of an addition of one or more other characteristics, constituent elements, and/or a group thereof is not excluded. Further, unless otherwise specified or when it is unclear that a single form is indicated in the context, the singular shall be construed to generally mean "one or more" in the present specification and the claims.

It shall be noted that before describing particular contents for carrying out the present disclosure, a configuration that is not directly related to a technical main point of the present disclosure is omitted within the range of the technical main point of the present disclosure. Further, the terms or the words used in the present specification and the claims shall be interpreted as a meaning and a concept corresponding to the technical spirit of the present disclosure on the principle that the inventor can appropriately define a concept of a term for describing his/her invention by the best method.

The computer-readable medium in the present specification may include any kind of medium, in which a program and data are stored, to be readable by a computer system. The computer-readable medium in the present disclosure may include a "computer-readable storage medium" and a "computer-readable transmission medium". According to one aspect of the present disclosure, the computer-readable medium may include a Read-Only Memory (ROM), a Random Access Memory (RAM), a Compact Disk (CD)-ROM, a Digital Video Disk (DVD)-ROM, a magnetic tape, a floppy disk, an optical data storage device, and the like. Further, the computer-readable transmission medium may include a predetermined transmittable form of medium implemented in the form of a carrier wave (for example, the transmission through the Internet). Additionally, the computer-readable medium is distributed in a system connected through a network, and also store compute readable codes and/or commands by a distribution method.

FIG. 1 is a schematic diagram illustrating a computing device 100 which represents text data in the form of a virtual fingerprint and utilizes the virtual fingerprint according to an exemplary embodiment of the present disclosure.

The configuration of the computing device 100 illustrated in FIG. 1 is merely a simplified example, and additional configurations for implementing the functions included in the claims by the computing device 100 according to the exemplary embodiment of the present disclosure may also be included in the scope of the claims. For example, when the computing device 100 performs a function of receiving an input from a user, the corresponding function may be performed by a network unit 130 or may also be performed by an additional configuration (for example, an input unit (not illustrated)). Further, when the computing device 100 performs a function of outputting specific result data, the corresponding function may be performed by a processor 110 or may also be performed by an additional configuration (for example, an output unit (not illustrated)). For another example, when the computing device 100 needs to capture an image or text, the operation may also be performed by an additional configuration (a capturing unit (not illustrated)).

As illustrated in FIG. 1, the computing device 100 may include a processor 110, a memory 120, and a network unit 130.

The computing device 100 according to the exemplary embodiment of the present disclosure may include a predetermined type of computer system or computing device, such as a microprocessor, a mainframe computer, a digital processor, a user terminal, a portable device, a controller, and a server. Additionally, the computing device 100 may also consist of a set of a plurality of computing device. For example, a specific operation of the computing device 100 is performed by a first computing device, and another operation of the computing device 100 is performed by a second computing device, so that the plurality of computing devices may also be operated in cooperation with each other.

The processor 110 may consist of one or more cores, and may include a predetermined form of processor, such as a Central Processing Unit (CPU), a General Purpose Graphics Processing Unit (GPGPU), and a Tensor Processing Unit (TPU) of the computing device, for a data analysis and deep learning. The processor 110 may read a computer program stored in the memory 120 and perform techniques for representing text data in the form of a virtual fingerprint and utilizing the virtual fingerprint according to the exemplary embodiment of the present disclosure. The processor 110 according to the exemplary embodiment of the present disclosure may perform a calculation for training a neural network. The processor 110 may perform the predetermined forms of calculation operation, such as processing of input data for learning in deep learning (DN), extraction of a feature from input data, an error calculation, updating of a weight of a neural network by using backpropagation, for learning of a neural network. At least one of the CPU, GPGPU, and the TPU of the processor 110 may process the learning of a network function. For example, the CPU and the GPGPU may process the learning of a network function and data classification by using the network function together. Further, in the exemplary embodiment of the present disclosure, the learning of the network function and the data classification by using the network function may be processed by using the processors of the plurality of computing devices together. Further, the computer program executed in the computing device 100 according to the exemplary embodiment of the present disclosure may be the predetermined form of program executable by a CPU, a GPGPU, or a TPU.

The computing device 100 in the exemplary embodiment of the present disclosure may distribute and process a network function by using at least one of the CPU, the GPGPU, and the TPU. Further, in the exemplary embodiment of the present disclosure, the computing device 100 may distribute and process a network function together with another computing device.

The processor 110 may divide text data into one or more segments based on a predetermined text segmentation algorithm, determine a mapping value assigned to one or more subsegments that form the divided segment based on a predetermined mapping algorithm, generate a coordinate value for each of the one or more segments based on the determined mapping value, and generate a virtual fingerprint having a phonetic feature for the text data based on the generated coordinate value. As described above, the operations of the processor 110 may perform a pre-processing process for data for the training with a deep neural network.

In the present specification, the "virtual fingerprint" may include the predetermined form of information that may uniquely represent text data, and for example, a vector, an image, a tensor, and/or a matrix may be included in the virtual fingerprint. Further, the "virtual fingerprint having a phonetic feature" may include the predetermined form of information (for example, a vector, an image, a tensor, and/or a matrix) in which pronunciation features of text data are uniquely represented.

In the present specification, the text data may mean the predetermined form of data represented in the form of text including a word, a sentence, and/or a paragraph. Further, in the present specification, the segment may mean a unit by which text data is divided, and the subsegment may mean a unit by which the segment is divided. For example, when the word "APPLE" is processed, "APPLE" itself may correspond to the text data, and "-A", "AP", "PP", "PL", "LE", "E_", and the like may correspond to the segments. In the foregoing example, "-", "A", "P", "P", "L", "E", "_", and the like may correspond to the subsegments. For example, in the present specification, the segment may include a pronunciation element, a pronunciation unit, a combination of letters, a combination of characters, a combination of numbers, and/or a combination of symbols. For example, the subsegment in the present specification may include a letter, a character, a phonetic symbol, a number, a symbol, and/or a combination thereof.

In the present specification, the virtual fingerprint having the phonetic feature may mean a vector value representing text data. Further, the virtual fingerprint having the phonetic feature may mean a vector value uniquely representing text data, and may also be defined as a text fingerprint.

Further, in the present specification, "text" and "information" may be often used interchangeably with each other.

The virtual fingerprint processed by using a network in the exemplary embodiment of the present disclosure may be the virtual fingerprint stored in the memory 120 of the computing device 100, the virtual fingerprint generated by the processor 110 of the computing device 100, virtual fingerprint information transmitted from a database and another computing device, such as a user's input, by the network unit 130. Further, the virtual fingerprint processed by using the network function in the exemplary embodiment of the present disclosure may be the virtual fingerprint stored in a computer-readable storage medium (for example, a flash memory, but the present disclosure is not limited thereto). The computing device 100 may receive text data and/or virtual fingerprint data stored in a computer-readable storage medium through an input/output interface (not illustrated).

The memory 120 may store a computer program for performing a virtual fingerprint generating method that represents text data and a method of comparing the generated virtual fingerprints according to the exemplary embodiment of the present disclosure, and the stored program may be read and driven by the processor 110. The memory 120 may include one or more memories including buffer caches. Herein, the memory 120 is a main storage device, such as a random access memory (RAM) including a dynamic RAM (DRAM) and a static RAM (SRAM), which a processor directly accesses, and may mean a volatile storage device, in which when power is cut, stored information is momentarily erased, but the memory is not limited thereto. Additionally, the memory 120 may also include a separate Database Management System (DBMS) and/or persistent storage medium. In this case, the persistent storage medium may mean a non-volatile storage medium, such as a storage device based on a flash memory and/or a battery-backup memory, which is capable of continuously storing predetermined data, as well as a magnetic disk, an optical disk, and a magneto-optical storage device. The persistent storage medium may also communicate with a processor and a memory of another computing device through various communication means including the network unit 130.

The network unit 130 may transceive predetermined data for representing text data in the form of a virtual fingerprint and performing a method of comparing the virtual fingerprints according to the exemplary embodiment of the present disclosure with another computing device, server, and the like. The network unit 130 may transceive data, such as text data and/or virtual fingerprint data, required in the exemplary embodiment of the present disclosure with another computing device, server, and the like. For example, the network unit 130 may receive training image data from memory 120, such as a training image database. Further, the network unit 130 may establish communication between the plurality of computing devices to enable the training of the network function to be distributed and performed by each of the plurality of computing devices, and data classification using the network function to be distributed and processed. Also, the communication between the components in the computing device 100 may also be performed by the network unit 130.

FIG. 2 is a flowchart 200 illustrating an example of the representation of text data in the form of a virtual fingerprint according to the exemplary embodiment of the present disclosure.

The flowchart 200 illustrated in FIG. 2 may be performed by the computing device 100. For example, the flowchart 200 may be performed by the processor 110 of the computing device 100.

According to the exemplary embodiment of the present disclosure described in the flowchart 200 illustrated in FIG. 2, text data may be converted to a virtual fingerprint having a phonetic feature, and the sound comparison between the text data may be efficiently performed through the comparison of the converted virtual fingerprints.

For example, in the present specification, the "phonetic feature" may be defined in the form of a vector value, a tensor value, a matrix value, and/or an image. For example, according to the exemplary embodiment in which the phonetic feature is a vector value in the present disclosure, the text data may be converted to a vector value by using a pronunciation element, and a sound similarity level between the plurality of text data may be measured through the converted vector value.

According to the exemplary embodiment of the present disclosure, the sound similarity level between the text data may be measured by transforming the text data into a pronunciation unit through a regulation-based soundex and/or metaphone method and measuring the similarity level between the transformed text by using a similarity measurement method, such as Euclidean distance, Edit distance, Cosine distance, and/or Jaccard distance. According to the exemplary embodiment of the present disclosure, the virtual fingerprints having the phonetic features having the vector values may be compared by utilizing a Deep Neural Network (DNN), such as a Convolutional Neural Network (CNN) and/or a Recurrent Neural Network (RNN).

As illustrated in FIG. 2, the computing device 100 may divide the received or input text data 210 into one or more segments 230 by using a text segmentation algorithm 220. The text data 210 may mean the predetermined data represented in the type of text including a sentence and/or a word.

The text segmentation algorithm 220 may determine the number of subsegments included in one segment 230 divided from the text data 210 as a unit of the division. For example, when one segment 230 consists of three subsegments, the text segmentation algorithm 220 may divide the segments 230 so that one segment 230 has a three-dimensional coordinate value. In the example, when the text data 210 is "APPLE", the text data may be divided into the segments 230 of "_AP", "APP", "PPL", "PLE", and "LE_".

In the exemplary embodiment of the present disclosure, the text segmentation algorithm 220 may divide the text data 210 into the segments 230 by a method of adding a start subsegment before an initial subsegment of the text data 210 and adding an end subsegment before a final subsegment of the text data 210. For example, when the text data 210, "APPLE", is inserted and the text segmentation algorithm 220 is defined that one segment 230 consists of two subsegments, the text data 210 may be divided into a total of six segments 230 of "-A", "AP", "PP", "PL", "LE", and "E_". In the foregoing example, "-" may be defined as a start subsegment added before "A" that is an initial subsegment of the text data 210, and "_" may be defined as an end subsegment added after "E" that is a final subsegment of the text data 210.

In the exemplary embodiment of the present disclosure, the text segmentation algorithm 220 divides the text data 210 into segments 230 by a method of forming m subsegments including a start subsegment and an end subsegment into one segment 230. Herein, m may mean a natural number. For example, when m is 3, three subsegments including a start subsegment and an end subsegment may form one segment 230. In the example, when the text data 210 is "APPLE", the text data 210 may be divided into the segments 230 of "_AP", "APP", "PPL", "PLE", and "LE_", and each of the divided segments 230 may include three subsegments.

In the exemplary embodiment of the present disclosure, a mapping algorithm 240 may determine a mapping value for each of the subsegments forming the segments 230. Based on the mapping value assigned to each of the subsegments, a coordinate value 250 for the segment 230 may be determined.

In the exemplary embodiment of the present disclosure, the mapping algorithm 240 may assign a unique mapping value in a subsegment unit or a subsegment combination unit based on pronunciation forms of letters forming the language to which the text data 210 belongs. In the example, the subsegment unit may include an alphabetic unit, a numeric unit, a symbol unit, a phonetic symbol unit, and/or other forms of language letter unit. Further, the subsegment combination unit may include a combination unit of alphabet letters, a combination unit of numbers, a combination unit of symbols, a combination unit of phonetic symbols, and/or a combination unit of language letters of other forms.

Further, the mapping algorithm 240 may assign a unique mapping value to a start subsegment added before an initial subsegment of the text data 210 and an end subsegment assigned after a final subsegment of the text data 210. Further, when a pronunciation similarity level between the letters (subsegments) belongs to a predetermined range, the mapping algorithm 240 sets a difference between the mapping values of the subsegments corresponding to the letters to have a first difference value, and when a pronunciation similarity level between the letters is outside the predetermined range, the mapping algorithm 240 sets the difference between the mapping values of the subsegments corresponding to the letters to have a second difference value. Herein, the first difference value may be smaller than the second difference value.

For example, when the language, to which the text data 210 belongs, is English, the mapping algorithm 240 may have the following mapping rule. {"-": 0, "a": 3, "e": 4, "i": 5, "o": 6, "u": 7 "h": 8, "b": 11, "v": 12, "p": 13, "f": 14, "c": 17, "k": 18, "q": 19, "g": 20, "d": 23, "t": 24, "j": 27, "z": 28, "w": 31, "y": 32, "r": 35, "l": 36, "s": 39, "x": 40, "n": 43, "m": 44, "_": 47}.

For another example, when the language, to which the text data 210 belongs, is English, the mapping algorithm 240 may have the following mapping rule. {"-": 0, "a": 1, "e": 2, "i": 3, "o": 4, "u": 5, "b": 6, "v": 7, "p": 8, "f": 9, "c": 10, "k": 11, "q": 12, "g": 13, "d": 14, "t": 15, "j": 16, "z": 17, "w": 18, "y": 19, "r": 20, "l": 21, "s": 22, "x": 23, "n": 24, "m": 25, "h": 26, "_": 27}.

In the foregoing examples, the subsegments are represented based on the alphabetic letters, but for example, the subsegments may also be represented based on the pronunciation form, such as "th", "oo", "sh", "ch", and "kn".

In the first example, the unique value may be mapped to each of the subsegments including the start subsegment and the end subsegment according to the mapping algorithm 240. Similar values may be mapped to the subsegments having similar pronunciations/sounds (in the first example, a difference value of one unit is assigned). Further, a larger difference value may be assigned to the subsegments having nonsimilar pronunciations/sounds while exceeding a specific threshold range (in the example, a difference value of three units is assigned). In the example, for the similar pronunciations to be distributed at similar locations, the subsegments having the similar pronunciations have the difference of one unit and the subsegments having the nonsimilar pronunciations have the difference of three units, so that the mapping algorithm 240 of a total length of 48 (28 values) may be generated.

In the second example, the unique value may be mapped to each of the subsegments including the start subsegment and the end subsegment according to the mapping algorithm 240. Similar values may be mapped to the subsegments having similar pronunciations/sounds. In the second example, a difference value of one unit may be mapped to the subsegments. Accordingly, the mapping algorithm 240 having a total length of 28 (28 values) may be generated.

The foregoing mapping algorithm 240 is illustrative, and the mapping algorithm 240 may divide and map Korean, any type of language structure including phonetic symbols (such as International Phonetic Alphabet (IPA)), and or a predetermined number structure, as well as English, in the same manner as that of the mapping algorithm 240. In an additional exemplary embodiment, when a structure including another type of language/number/symbol is inserted, in addition to English, the computing device 100 may also execute the text segmentation algorithm 220 after converting another type of structure into English.

According to the mapping algorithm 240 according to the exemplary embodiment of the present disclosure, a coordinate value 250 for each of a total of six segments 230 of "-A", "AP", "PP", "PL", "LE", and "E_" may be generated. In the example, the six segments 230, "-A", "AP", "PP", "PL", "LE", and "E_", may be assigned with the coordinate values 250 of "-A": (0, 1), "AP": (1, 8), "PP": (8, 8), "PL": (8, 21), "LE": (21, 2), and "E_": (2, 28), respectively. The foregoing example is the case where the text segmentation algorithm 220 sets the number of subsegments forming the segment 230 to two. When the text segmentation algorithm 220 sets the number of subsegments forming the segment 230 to three, the coordinate value 250 in the three-dimensional form may be allocated to each segment 230. That is, based on a size value of the segment 230 divided from the text data 210 by the text segmentation algorithm 220, the size of the dimension for representing the virtual fingerprint 270 having the phonetic feature may be determined.

According to the exemplary embodiment of the present disclosure, a virtual fingerprint generating algorithm 260 may display the generated coordinate values 250 in an n-dimensional space and generate the virtual fingerprint 270 having the phonetic feature for the text data 210. The virtual fingerprint generating algorithm 260 may generate the virtual fingerprint 270 having the phonetic feature for the text data by determining points in the n-dimensional space corresponding to the generated coordinate values for each of the one or more segments and connecting the determined points.

According to the exemplary embodiment of the present disclosure, the first dimension and the n−1$^{th}$ dimension in the n-dimensional space may correspond to the n−1 dimensional coordinate value 250 assigned to the subsegments forming the segment 230, and the n$^{th}$ dimension in the n-dimensional space may correspond to a one-dimensional value assigned in the unit of the divided segment 230. For example, when for the text data 210, a total of six segments 230 of "-A", "AP", "PP", "PL", "LE", and "E_" are divided, and the coordinate value 250 for each segment 230 is generated like "-A": (0, 1), "AP": (1, 8), "PP": (8, 8), "PL": (8, 21), "LE": (21, 2), 및 "E_": (2, 28), each coordinate value 250 may form, for example, a two-dimensional space in an X-axis and a Y-axis. Further, the coordinate value 250 of each segment 230 may form a one-dimensional space in a Z-axis, so that for example, "-A" segment may be assigned with the Z-axis value of 0, "AP" segment may be assigned with the Z-axis value of 1, "PP" segment may be assigned with the Z-axis value of 2, "PL" segment may be assigned with the Z-axis value of 3, "LE" "segment may be assigned with the Z-axis value of 4, and "E_" segment may be assigned with the Z-axis value of 5. By the method, by connecting the coordinate values 250 assigned in the three-dimensional space in which n=3, the virtual fingerprint 270 having the phonetic feature for the text data 210 may be represented. The virtual fingerprint 270 having the phonetic feature may have a vector value.

Also, the virtual fingerprint generating algorithm 260 may also represent the virtual fingerprint 270 having the phonetic feature in a space having the same dimension information as the dimension information of the coordinate values assigned to the divided segments 230 of the text data 210.

The virtual fingerprint generating algorithm 260 may generate the virtual fingerprint 270 having the phonetic feature by a method of differently displaying the connections between the points corresponding to the coordinate values 250 based on order information on the segments 230 divided from the text data 210. For example, the virtual fingerprint generating algorithm 260 may generate the virtual fingerprint having the phonetic feature by a method of displaying the connection by assigning a higher weight to the connection between the segments in the previous order than the connection between the segments in the later order based on order information on the segments 230 divided from the text data 210. For another example, the virtual fingerprint generating algorithm 260 may generate the virtual fingerprint having the phonetic feature by a method of displaying the connection by assigning a weight to the connection between the segments 250 having the most advanced order based on order information on the segments 230 divided from the text data 210.

In the examples, the method of displaying the connection by assigning the weight may include at least one of: a method of displaying a connection having a higher weight with a larger thickness compared to a connection having a lower weight; and a method of displaying a connection having a higher weight with higher color intensity compared to a connection having a lower weight. For example, based on length information on the text data 210, at least one of a value of a thickness and a value of the color intensity of the represented virtual fingerprint may be determined. For example, in the comparison of the pronunciation/sound similarity level between the text data 210, an initial consonant may be more important than a vowel or a final consonant. Accordingly, a higher weight (the thickness and/or color intensity) is assigned to the initial constant of the text data 210, compared to the vowel or the final consonant, thereby more accurately determining the pronunciation/sound similarity level. Also, in the determining of the thickness and/or the color intensity of the connection for the coordinate values 250, as the length of the text data 210 is shorter, the initial thickness and/or color intensity of the connection is represented thicker and/or darker, thereby more accurately determining a pronunciation similarity level. In the present specification, the "color intensity" may include transparency of color and/or intensity of color.

In another example, the image generating algorithm 260 generating the virtual fingerprint having the phonetic feature may generate the virtual fingerprint having the phonetic feature by a method in which at least one of a thickness and color intensity of a connection line connecting the determined points is gradually changed based on at least one of a thickness and color intensity determined for the determined points. That is, values of a thickness and color intensity of the connection line connecting both points may be changed based on a thickness and/or color intensity value assigned to both points in stages. In the example, the connection line may also be generated in a gradation form.

In another example, the image generating algorithm 260 generating the virtual fingerprint having the phonetic feature may generate the virtual fingerprint having the phonetic feature by a method of displaying a center portion of a connection line connecting two points and a peripheral portion with different color intensity. That is, the connection line may be divided into an internal portion and an external portion, and the color intensity of the internal portion may have a larger value than the color intensity of the external portion.

According to the exemplary embodiment of the present disclosure, to determine the pronunciation/sound similarity level for two or more text data 210, the computing device 100 may compare similarity between the virtual fingerprints 270 having the phonetic features.

FIG. 3 is a diagram illustrating an example of a method of representing text data in the form of a virtual fingerprint and utilizing the virtual fingerprint according to the exemplary embodiment of the present disclosure. For example, the method implemented in FIG. 3 may be performed by the computing device 100. The operations of the method illustrated in FIG. 3 are illustrative, and depending on the design form, additional operations may be included or some of the operations may also be omitted.

As illustrated in FIG. 3, the computing device 100 may divide text data into one or more segments based on a predetermined text segmentation algorithm (310). Then, the computing device 100 may determine a mapping value assigned to each of one or more subsegments forming the divided segments based on a predetermined mapping algorithm (320). The computing device 100 may generate a coordinate value for each of the one or more segments based on the determined mapping value (330). Then, the computing device 100 may generate a virtual fingerprint having a phonetic feature for the text data based on the generated coordinate value (340). The computing device 100 may compare the virtual fingerprints having the phonetic features generated for the plurality of text data (350), and determine a pronunciation similarity level (sound similarity level) for the plurality of text data according to the comparison result (360).

The illustrative embodiment of determining a pronunciation/sound similarity level (sound similarity level) for the text data may be utilized in an examination of a trademark application. In the examination of whether to register a trademark application, if two compared trademarks are similar in sound (and are similar in designated goods or services) with each other, the filed trademark application may be rejected. Accordingly, before the proceeding of the filing of the trademark application, a similarity with the prior trademark application may be an important issue.

According to the exemplary embodiment of the present disclosure, the sound similarity for the text data may be efficiently and accurately determined, so that it is possible to efficiently predict a possibility that the corresponding trademark application is rejected before the proceeding of the filing of the trademark application. That is, the method according to the exemplary embodiment of the present disclosure may determine the similarity in sound for two trademark applications by comparing vector values according to the pronunciations of the two trademarks. For example, the methods of comparing the vector values may adopt Cosine distance, Jaccard distance, Levenshtein distance, and/or the deep learning method. For example, when the method illustrated in FIG. 3 corresponds to the comparing method utilizing deep learning, operations 310 to 340 may mean pre-processing operations for inputting data to the deep neural network.

According to the exemplary embodiment of the present disclosure, the n-dimensional virtual fingerprint, which uniquely identifies the pronunciation/sound of the text data, is generated, so that it is possible to more accurately and efficiently determine pronunciation similarity compared to the existing methods of comparing pronunciations between the text data. That is, since a unique fingerprint is assigned to each text data based on a pronunciation, the pronunciation similarity of the text data may be efficiently determined through the comparison between the fingerprints.

FIG. 4 is a diagram illustrating an illustrative training process for text data represented in the form of a virtual fingerprint according to the exemplary embodiment of the present disclosure. The operations of the method illustrated in FIG. 4 are illustrative, and depending on the design form, additional operations may be included or some of the operations may also be omitted. The deep neural network in the present specification may include at least one of a Convolutional Neural Network (CNN) structure and a Recurrent Neural Network (RNN) structure.

The example illustrated in FIG. 4 is an example of utilizing the deep learning technique in determining a sound/pronunciation similarity level of text data by using a virtual fingerprint.

As illustrated in FIG. 4, the computing device 100 may generate labeled training data including similarity determination result information for two or more text data and virtual fingerprints having phonetic features generated in correspondence to the two or more text data (410). For example, the similarity determination result information may mean a similarity determination result value (that is, similarity or non-similarity) for two or more text data taught by a user.

Then, the computing device 100 may compare result data of the labeled training data output through the deep neural network with the similarity determination result data included in the labeled training data (420). That is, operation 420 may mean a process of calculating an output error of the deep neural network. For example, the labeled training data input to the deep neural network may be represented so that the similarity determination result information taught by the user and information on the virtual fingerprints having the phonetic features make one pair. Further, the result data of the labeled training data output through the deep neural network may mean a result value (that is, a value representing similarity or non-similarity between both text data) output through an output node of the deep neural network after inputting data for two or more virtual fingerprints to the deep neural network. Accordingly, in operation 420, it may be determined whether an error exists between the labeled taught value and the result value output through the deep neural network.

Then, the computing device 100 may train the nodes of the deep neural network by using a back-propagation method based on the comparison result of operation 420 (430). Herein, the back-propagation method may mean a method in which in the neural network including the deep neural network (that is, the plurality of hidden layers), an error begins from an output layer and is transmitted in a direction of the hidden layer, so that a weight between the nodes is changed. Accordingly, operation 430 may mean the neural network training process for improving the generalization performance of the neural network by updating the weight between the nodes in the neural network through the error.

The operations illustrated in FIG. 4 represent the process of training the neural network about the similarity between two or more text data by utilizing the generated virtual fingerprint.

The structure of the deep neural network according to the exemplary embodiment of the present disclosure will be described below regarding FIG. 8. FIG. 5 is a diagram illustrating an illustrative method of comparing text data through the trained deep learning network according to the exemplary embodiment of the present disclosure.

The operations of the method illustrated in FIG. 5 are illustrative, and depending on the design form, additional operations may be included or some of the operations may also be omitted.

The operations illustrated in FIG. 5 represent a process of the neural network, in which when the neural network receives an input of two or more predetermined text data after the neural network is completely trained (that is, after the neural network is generalized), the neural network outputs a comparison result for the two or more text data.

The computing device 100 may receive an input for two or more text data (510). The two or more input text data may mean the text data of which pronunciation/sound similarity is to be determined.

Then, the computing device 100 may generate virtual fingerprints having phonetic features for the two or more text data (520). The method of generating the virtual fingerprints may be performed by the same methods as operations 310 to 340 illustrated regarding FIG. 3.

Then, the computing device 100 may generate comparison result information for the virtual fingerprints having the phonetic features by a network function of the trained deep neural network (530). That is, operation 530 may mean the process, in which a result value (that is, whether the two or more virtual fingerprints are similar in the sound/pronunciation) is output from an output layer of the deep neural network after the virtual fingerprints, which are to be compared, are input to the deep neural network.

Then, the computing device 100 may output a result value for whether the two or more virtual fingerprints are similar in the pronunciation/sound through the output layer (540). That is, through operation 540, a result of the determination of the sound/pronunciation similarity between the two or more text data may be output.

FIG. 6A is a diagram illustrating an example of text data represented in the form of a virtual fingerprint according to the exemplary embodiment of the present disclosure.

In FIG. 6, reference number 600A represents a virtual fingerprint for text data "KTLIB", and reference number 600B represents a virtual fingerprint for text data "KTRIBE". The two text data are different in an appearance, but are similar in pronunciation.

In FIG. 6, numerical values for two axes representing the two virtual fingerprints may correspond to coordinate values mapped to segments, respectively.

As illustrated in FIG. 6, the text data "KTLIB" may be divided into six segments of "-K", "KT", "TL", "LI", "IB", and "B_". Further, according to the mapping algorithm, coordinates values may be mapped to the six segments in the order of 601, 602, 603, 604, 605, and 606, respectively. When the coordinate values are connected, a virtual fingerprint represented in 600A may be generated. As illustrated in 600A, a color intensity value may be decreased from 601 to

606 (That is, from an initial consonant to a final consonant). That is, the initial consonant has a higher weight, so that a pronunciation similarity level may be determined with higher accuracy. As illustrated in FIG. 6, the text data "KTRIBE" may be divided into seven segments of "-K", "KT", "TR", "RI", "IB", "BE", and "E_". Further, according to the mapping algorithm, coordinates values may be mapped to the seven segments in the order of 611, 612, 613, 614, 615, 616, and 617. When the coordinate values are connected, a virtual fingerprint represented in 600B may be generated. As illustrated in 600B, a color intensity value may be decreased from 611 to 617 (That is, from an initial consonant to a final consonant). That is, the initial consonant has a higher weight, so that the pronunciation similarity level may be determined with higher accuracy.

The virtual fingerprints 600A and 600B generated by the foregoing method may have the similar forms of geometric structures, and through the comparison between the virtual fingerprints 600A and 600B, the virtual fingerprints 600A and 600B may be determined to be similar to each other in pronunciation.

FIG. 6B is a diagram illustrating an example of a method of comparing text data represented in the form of the virtual fingerprint according to the exemplary embodiment of the present disclosure.

Reference number 650 represents result data of a comparison between a virtual fingerprint of text data "VOOCHO" and a virtual fingerprint of text data "VOCHO".

According to the exemplary embodiment of the present disclosure, two virtual fingerprints are input to a first channel and a second channel of RGB, respectively, and a value of 0 is assigned to a remaining third channel, so that a pronunciation comparison result value for the two virtual fingerprints may be generated. In the example, the virtual fingerprint may mean an image having a specific vector value. The two virtual fingerprints are associated with one image and based on an intensity value of an overlapping color in the one associated image, a pronunciation similarity level between the two virtual fingerprints may be determined. In reference number 650, 650B represents a virtual fingerprint portion represented by R (for example, a virtual fingerprint portion for the text data "VOOCHO"), 650C represents a virtual fingerprint portion represented by G (for example, a virtual fingerprint portion for the text data "VOCHO"), and 650A represents an overlapping portion of the two virtual fingerprints in which R and G overlap (that is, the representation in the yellow form). Accordingly, based on color intensity (or a size of an area) of 650A, whether the two text data are similar in pronunciation may be determined. In reference number 650, a comparison result value indicating that both text data are similar in pronunciation may be obtained.

In reference number 660, 660B represents a virtual fingerprint portion represented by R (for example, a virtual fingerprint portion for text data "LABIT", 660C represents a virtual fingerprint portion represented by G (for example, a virtual fingerprint portion for text data "COCOON", and 660A represents an overlapping portion of the two virtual fingerprints in which R and G overlap (that is, the representation in the yellow form). Accordingly, based on color intensity (or a size of an area) of 660A, whether the two text data are similar in pronunciation may be determined. In reference number 660, a comparison result value indicating that both text data are not similar in pronunciation may be obtained.

As described above, according to the exemplary embodiment of the present disclosure, there may be various methods of comparing two or more virtual fingerprints.

For example, the method of comparing two or more virtual fingerprints may include a method of comparing virtual fingerprints having phonetic features by using concatenated virtual fingerprints by concatenating a first virtual fingerprint having a phonetic feature for first text data among the plurality of text data and a second virtual fingerprint having a phonetic feature for second text data among the plurality of text data.

For example, the method of comparing two or more virtual fingerprints may include a method of applying one color among R (Red), G (Green), and B (Blue) to a first virtual fingerprint having a phonetic feature for first text data among the plurality of text data, applying another color among R (Red), G (Green), and B (Blue) to a second virtual fingerprint having a phonetic feature for second text data among the plurality of text data, concatenating the first virtual fingerprint and the second virtual fingerprint to which the colors are applied, and comparing the virtual fingerprints having the phonetic features based on at least one of intensity and weight of the color in the concatenated virtual fingerprints.

For example, the method of comparing two or more virtual fingerprints may include a method of comparing the virtual fingerprints based on pixel values included in the virtual fingerprints.

For example, the method of comparing two or more virtual fingerprints may include at least one of a method of calculating a Euclidean distance value between pixel values of a first virtual fingerprint having a phonetic feature for first text data among the plurality of text data and pixel values of a second virtual fingerprint having a phonetic feature for second text data among the plurality of text data, and a method of calculating a cosine distance value between pixel values of a first virtual fingerprint and pixel values of a second virtual fingerprint.

FIG. 6C is a diagram illustrating an example of text data represented in the form of the virtual fingerprint according to the exemplary embodiment of the present disclosure.

FIG. 6C represents an illustrative virtual fingerprint, in which subsegments are assigned to an X-axis 670A according to a mapping algorithm, and subsegments in the same order as the order of the subsegments assigned to the X-axis 670A are assigned to a Y-axis 670B according to the mapping algorithm. The virtual fingerprint in 6C may uniquely represent text data "Castic".

In the virtual fingerprint illustrated in FIG. 6C, the color intensity of a connection and/or an area of a connection may be varied based on a pronunciation order (an order of segments) of the text data. For example, a color intensity value of the connection may be decreased in a pronunciation order of the text data. For example, an area of the connection may be decreased in a pronunciation order of the text data.

In FIG. 6C, the English alphabets are assigned to the X-axis 670A and the Y-axis 670B as subsegments. In an additional exemplary embodiment, the language, other than English, may also consist of subsegments, and in this case, the language may be translated or transliterated to English and then subsegments in the form of English alphabet may be assigned to the X-axis 670A and the Y-axis 670B. Further, letters, numbers, symbols, and a combination thereof forming the languages, other than English, may also be assigned to the X-axis 670A and the Y-axis 670B as subsegments. Further, pronunciation symbols and a combination thereof may also be assigned to the X-axis 670A and the Y-axis 670B as subsegments. Further, when a new pronunciation is derived with a combination of the English alphabets, the newly derived pronunciations may also be assigned to the X-axis 670A and the Y-axis 670B as subsegments.

In FIG. 6C, the orders of the subsegments assigned to the X-axis 670A and the Y-axis 670B or the values of the subsegments are the same. In the additional exemplary embodiment of the present disclosure, the orders of the subsegments assigned to the X-axis 670A and the Y-axis 670B may also be different from each other. In the additional exemplary embodiment of the present disclosure, the orders of the subsegments assigned to the X-axis 670A and the Y-axis 670B may also have different forms. For example, the X-axis 670A may have the subsegment of the English alphabet, and the Y-axis 670B may also have the numerical subsegment. For example, the X-axis 670A may have the subsegment of the letter of another language, other than English and the Y-axis 670B may have the subsegment of a pronunciation symbol. For example, the X-axis 670A may have the subsegment of a pronunciation symbol, and the Y-axis 670B may also have the subsegment of a symbol. For example, the X-axis 670A may have the numerical subsegment and the Y-axis 670B may also have the subsegment of the English alphabet. As described above, depending on the design form, various forms of subsegments or combinations thereof may be assigned to the X-axis 670A and the Y-axis 670B.

Figure 7:
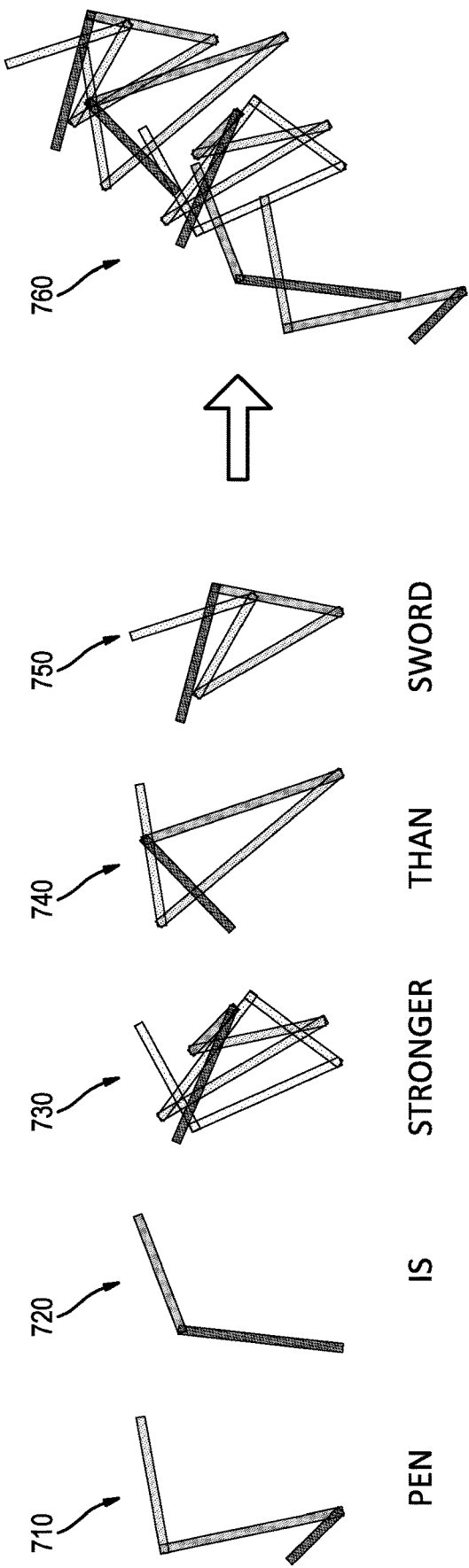
FIG. 7 is a diagram illustrating an example of text data represented in the form of the virtual fingerprint according to the exemplary embodiment of the present disclosure.

FIG. 7 is a diagram illustrating an example of text data represented in the form of the virtual fingerprint according to the exemplary embodiment of the present disclosure.

As illustrated in FIG. 7, reference numeral 710 is a virtual fingerprint representing text data "PEN", reference numeral 720 is a virtual fingerprint representing text data "IS", reference numeral 730 is a virtual fingerprint representing text data "STRONGER", reference numeral 740 is a virtual fingerprint representing text data "THAN", and reference numeral 750 is a virtual fingerprint representing text data "SWORD". Reference number 760 represents an N-dimensional virtual fingerprint in which the virtual fingerprints corresponding to reference numbers 710 to 750 are stacked in an N-dimensional form (in the example of FIG. 7, five dimensions).

According to the exemplary embodiment of the present disclosure, when the virtual fingerprint for a word is stacked in the N-dimension, a unique virtual fingerprint for a sentence or a paragraph may be generated. As illustrated in FIG. 6C, when a sentence is divided into the unit of meaning or pronunciation and each virtual fingerprint (for example, a vector value) is stacked in a stack form, the sentence may be transformed to a virtual fingerprint (for example, a multi-channel image) having multiple channels. By utilizing the multi-channel virtual fingerprint generated by the foregoing method, a pronunciation similarity level between the sentences or the paragraphs may also be calculated.

According to the exemplary embodiment of the present disclosure, when sentence data is received, the sentence data is divided in the unit of pronunciation or meaning based on a sentence segmentation algorithm, so that the plurality of text data may be generated. Then, the computing device 100 may convert the sentence data to the virtual fingerprint of the N-channel by stacking virtual fingerprints having phonetic features generated in correspondence to the plurality of text data on the N-dimension.

Currently, to avoid the problem of plagiarism in papers, it is necessary to determine the similarity between documents including sentences and/or paragraphs. The method of determining the pronunciation similarity level of the sentences/paragraphs according to the exemplary embodiment of the present disclosure may find a similar document based on the sound similarity level, so that it is possible to easily determine the plagiarism of papers.

Figure 8:
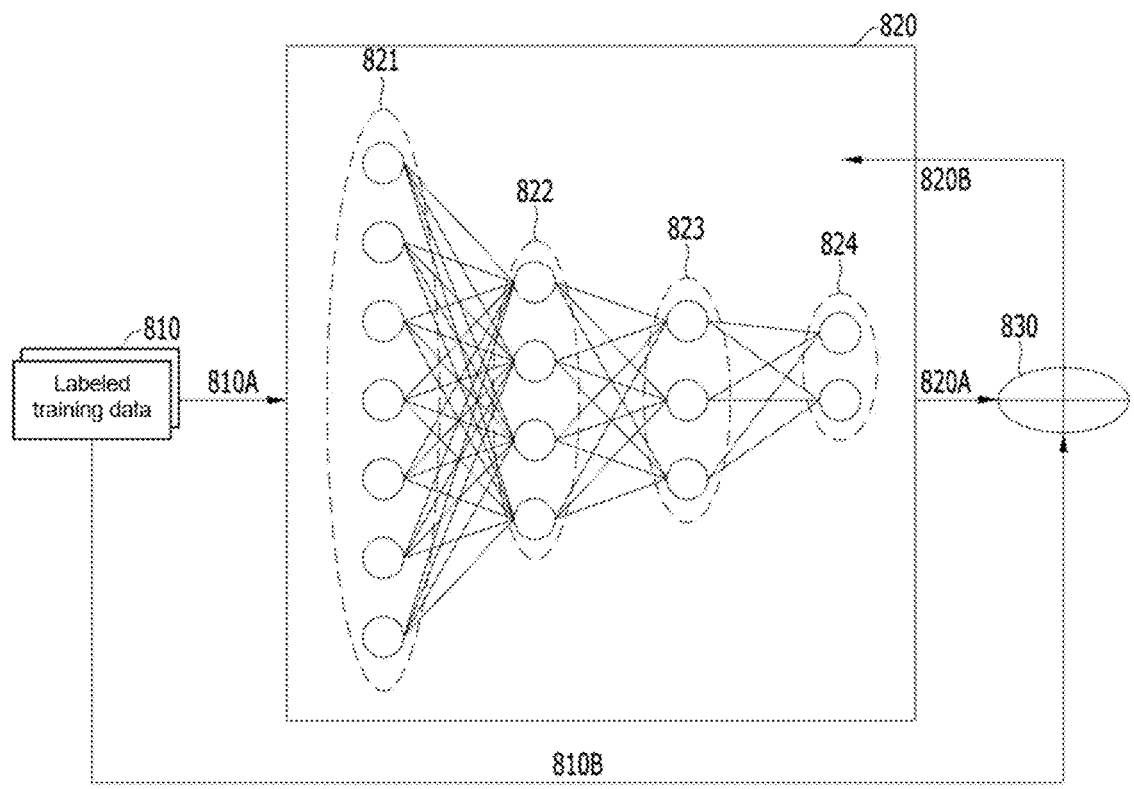
FIG. 8 is a diagram illustrating an example of a process in which labeled training data is trained through a deep neural network according to the exemplary embodiment of the present disclosure.

FIG. 8 is a diagram illustrating an example of a process in which labeled training data is trained through a deep neural network according to the exemplary embodiment of the present disclosure. A deep neural network 820 illustrated in FIG. 8 is illustrative, and the number of layers and nodes may be changed according to the design form.

According to the exemplary embodiment of the present disclosure, labeled training data 810 may be input to the deep neural network 820 (S810A). The labeled training data 810 may include similarity determination result data for two or more text data, and data for virtual fingerprints having phonetic features generated in correspondence to the two or more text data.

Throughout the present specification, a nerve network, a network function, and a neural network may be used as the same meaning. A neural network may consist of a set of interconnected computational units, which may generally be referred to as "nodes". The "nodes" may also be called "neurons". The neural network includes at least one node. The nodes (or neurons) forming the neural networks may be interconnected by one or more "links".

In the neural network, one or more nodes connected through the links may relatively form a relation of an input node and an output node. The concept of the input node is relative to the concept of the output node, and a predetermined node having an output node relationship to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a link connecting the input node and the output node may have a weight. The weighted is variable, and for the neural network to perform a function desired by the neural function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with through one or more links to form a relation of an input node and an output node in the neural network. A characteristic of the neural network may be determined according to the number of nodes and links in the neural network, a correlation between the nodes and the links, and a weight value assigned to each of the links. For example, when there are two neural networks in which the numbers of nodes and links are the same and the weight values between the links are different, two neural networks may be recognized to be different from each other.

The neural network may include one or more nodes. Some of the nodes forming the neural network may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

As illustrated in FIG. 8, the neural network 820 may include an input layer 821, hidden layers 822 and 823, and an output layer 824.

The initial input node (or the input layer 821) may mean one or more nodes to which data is directly input without passing through a link in a relationship with other nodes among the nodes in the neural network. Otherwise, the initial input node may mean nodes that do not have other input nodes connected through the links in a relation between the node based on the link in the neural network. Similarly, the final output node may be one or more nodes (for example, the output layer 824) which do not have an output node in relation to other nodes among the nodes in the neural network. Further, the hidden node may mean nodes, not the initial input node and the final output node, forming a nerve network.

The neural network 820 according to the exemplary embodiment of the present disclosure may be the neural network having the form in which the number of nodes of the input layer 821 may be larger than the number of nodes of the hidden layer 823 close to the output layer 824, and the number of nodes is decreased according to the progress from the input layer 821 to the hidden layers 822 and 823. For example, the number of output nodes of the output layer 824 of the neural network 820 according to the exemplary embodiment of the present disclosure maybe two. In the example, to present two output results including similarity or nonsimilarity, the number of output nodes may be set to two.

The Deep Neural Network (DNN) may mean the neural network including the plurality of hidden layers 822 and 823 between the input layer 821 and the output layer 824 as illustrated in FIG. 8. When the DNN is used, it is possible to recognize a latent structure of data. That is, latent structures of a virtual fingerprint, a picture, text, video, voice, and music (for example, the kind of object included in a picture, contents and emotion of text, and contents and emotion of voice) may be recognized. The DNN may include a Convolutional Neural Network (CNN), a Recurrent Neural Network (RNN), a Restricted Boltzmann Machine (RBM), a Deep Belief Network (DBN), a Q network, and/or a U network Siamese network.

As illustrated in FIG. 8, the similar determination result data for the two or more text data of the labeled training data 810 may reach a comparison module 830 through a path 810B. Further, a result value of the two or more fingerprints passing through the neural network 820 may reach the comparison module 830 through a path 820A. The comparison module 830 may compare the similarity determination result data and the result value of the two or more fingerprints passing through the neural network 820 and determine an error. When the error is generated, the error may be transmitted in a back-propagation method in the direction from the output layer 824 to the hidden layers 823 and 822 along a path 820B. According to the transmission of the error, the weight of the link between the nodes may reflect the error and be updated.

Figure 9:
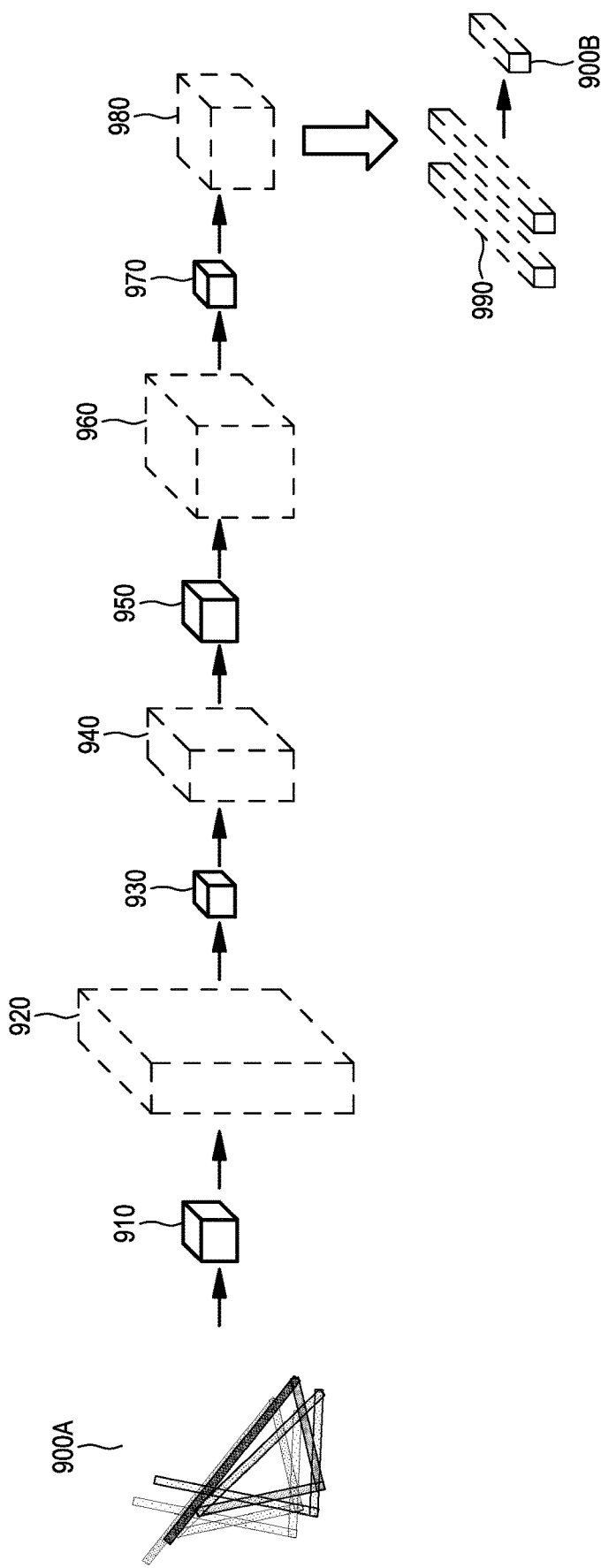
FIG. 9 is a diagram illustrating an example of a process in which a feature of text data represented in the form of a virtual fingerprint is extracted through the deep neural network according to the exemplary embodiment of the present disclosure.

FIG. 9 is a diagram illustrating an example of a process in which a feature of text data represented in the form of a virtual fingerprint is extracted through the deep neural network according to the exemplary embodiment of the present disclosure. The exemplary embodiment illustrated in FIG. 9 is illustrative, and the number of components and the like may be changed according to the design form.

FIG. 9 illustrates an example of a process in which features of the virtual fingerprints of N channels are extracted through the CNN. CNN according to the exemplary embodiment of the present disclosure may include a feature extraction neural network illustrated in FIG. 9 and a category classification neural network (that is, the neural network 820 in FIG. 8) illustrated in FIG. 8. Additionally, the neural network illustrated in FIG. 8 may also include both a feature extraction neural network and a category classification neural network. Additionally, the neural network illustrated in FIG. 9 may also include both a feature extraction neural network and a category classification neural network.

A virtual fingerprint 900a of an N-channel may be generated by concatenating virtual fingerprints for two or more text data. In the example according to FIG. 9, virtual fingerprints for two text data may be concatenated with each other, so that virtual fingerprints of two channels may be generated. The virtual fingerprints of the two channels may pass through one or more convolutional layers 910 and 950 and one or more pooling layers 930 and 970, so that the features may be extracted to be input to the classification neural network.

The convolutional layers 910 and 950 in the present specification perform a function of filtering an input virtual fingerprint through a convolutional computation. The convolutional layers 910 and 950 may generate a feature map for the input virtual fingerprint. Accordingly, the convolutional layers 910 and 950 may obtain the feature map by computing the input virtual fingerprint and the convolutional filter. The feature map may be finally output through an active function (for example, a ReLU function, a sigmoid function, and/or a tanh function.

The pooling layers 930 and 970 in the present specification may serve to decrease the size of the input virtual fingerprint. The pooling layers 930 and 970 may group pixels belonging to a specific region in the input virtual fingerprint to generate a representative value (for example, a maximum value or a mean value) for the group. The pooling layers 930 and 970 decreases the size of the input virtual fingerprint, thereby being helpful to decrease the amount of calculation of the computing device 100 and prevent overfitting.

The two-channel virtual fingerprint 900A input to the CNN may have the form of 28 (width)×28 (length)×2 (the number of channels). The two-channel virtual fingerprint 900A may be transformed to the form of 28×28×32 by utilizing the first convolutional layer 910 of 5 (width)×5 (length)×32 (the number of filters). Then, for example, the virtual fingerprint 920 input to the CNN may be transformed to a size of 14×14×32 through the first pooling layer 930 of 2×2 (stride: 2) utilizing the max-pooling method (940).

When the foregoing process is performed one more time (that is, when the second convolutional layer 950 and the second pooling layer 970 are utilized), a virtual fingerprint (a virtual fingerprint 980 is obtained after a fingerprint 960) transformed in the form of 7×7×64 may be obtained. Then, a transformed virtual fingerprint 990 in the form of 1×1×1024 may be obtained by applying a flatter shape to the virtual fingerprint 980. Last, the virtual fingerprint 990 in the form of 1×1×1024 may be trained to have a value of 0 or 1 through softmax (900B). In the corresponding process, for example, the deep learning methods, such as Batch Normalize, and Dropout, may be utilized.

A parameter value of the convolutional layer and/or a parameter value of the pooling layer may be variably updated through the training in the CNN.

FIG. 10 is a diagram illustrating an example of a means which represents text data in the form of a virtual fingerprint and utilizes the virtual fingerprint according to the exemplary embodiment of the present disclosure.

For example, a means implemented in FIG. 10 may be related to the computing device 100. The means of the method illustrated in FIG. 10 is illustrative, and additional means may be included or some of the means may be omitted according to the design form.

As illustrated in FIG. 10, the computing device 100 may include a means 1010 for dividing text data into one or more segments based on a predetermined text segmentation algorithm, a means 1020 for determining a mapping value assigned to each of one or more subsegments forming the divided segment based on a predetermined mapping algorithm, a means 1030 for generating a coordinate value for each of the one or more segments based on the determined mapping value, a means 1040 for generating a virtual fingerprint having a phonetic feature for the text data based on the generated coordinate value, a means 1050 for comparing the virtual fingerprints having the phonetic features generated for the plurality of text data, and a means 1060 for determining a pronunciation similarity level (a sound similarity level) for the plurality of text data according to a result of the comparison.

FIG. 11 is a diagram illustrating an example of logic that represents text data in the form of a virtual fingerprint and utilizes the virtual fingerprint according to an exemplary embodiment of the present disclosure.

For example, the logic implemented in FIG. 11 may be performed by the computing device 100. The logic of the method illustrated in FIG. 11 is illustrative and additional logic may be included or some of the logic may be omitted according to the design form.

As illustrated in FIG. 11, the computing device 100 may perform logic 1110 for dividing text data into one or more segments based on a predetermined text segmentation algorithm, logic 1120 for determining a mapping value assigned to each of one or more subsegments forming the divided segment based on a predetermined mapping algorithm, logic 1130 for generating a coordinate value for each of the one or more segments based on the determined mapping value, logic 1140 for generating a virtual fingerprint having a phonetic feature for the text data based on the generated coordinate value, logic 1150 for comparing the virtual fingerprints having the phonetic features generated for the plurality of text data, and logic 1160 for determining a pronunciation similarity level (a sound similarity level) for the plurality of text data according to a result of the comparison.

FIG. 12 is a block diagram illustrating an example of a computing device according to an exemplary embodiment of the present disclosure.

The present disclosure has been generally described the features executable in one or more servers, computing devices, or processors, but those skilled in the art will appreciate well that the present disclosure may be implemented in combination with other program modules and/or in a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computing system configurations, as well as a single-processor or multiprocessor computer system, a mini-computer, and a mainframe computer.

The exemplary embodiments of the present disclosure may be carried out in a distributed computing environment, in which certain tasks are performed by remote processing devices connected through a communication network. In the distributed computing environment, a program module may be positioned in both a local memory storage device and a remote memory storage device.

The computing device generally includes various computer-readable medium. A computer-accessible medium may be a computer-readable medium regardless of the kind of medium, and the computer-readable medium includes volatile and non-volatile media, transitory and non-transitory media, portable and non-portable media. As a non-limited example, the computer-readable medium may include a computer-readable storage medium and a computer-readable transmission medium.

The computer-readable storage medium includes volatile and non-volatile media, transitory and non-transitory media, and portable and non-portable media constructed by a predetermined method or technology, which stores information, such as a computer-readable command, a data structure, a program module, or other data. The computer-readable storage medium includes a random access memory (RAM), a read-only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage devices, or other predetermined media, which are accessible by a computer and are used for storing desired information, but is not limited thereto.

The computer-readable transport medium generally includes all of the information transport media, such as a carrier wave or other transport mechanisms, which implement a computer-readable command, a data structure, a program module, or other data in a modulated data signal. The modulated data signal means a signal, of which one or more of the characteristics are set or changed to encode information within the signal. As a non-limited example, the transceiving (communication) medium includes a wired medium, such as a wired network or a direct-wired connection, and a wireless medium, such as sound, radio frequency (RF), infrared rays, and other wireless media. A combination of the predetermined media among the foregoing media is also included in a range of the computer-readable transport medium.

FIG. 12 illustrates an illustrative environment including a computing device 1602 according to the exemplary embodiment of the present disclosure and implementing several aspects of the present disclosure, and the computing device 1602 includes a processing device 1604, a system memory 1606, and a system bus 1608. The system bus 1608 connects system components including the system memory 1606 (not limited) to the processing device (processor) 1604. The processing device 1604 may be a predetermined processor among various common processors. A dual processor and other multi-processor architectures may also be used as the processing device 1604.

The system bus 1608 may be a predetermined one among several types of bus structure, which may be additionally connectable to a local bus using a predetermined one among a memory bus, a peripheral device bus, and various common bus architectures. The system memory 1606 includes a ROM 1610, and a RAM 1612. A basic input/output system (BIOS) is stored in a non-volatile memory 1610, such as a ROM, an erasable and programmable ROM (EPROM), and an EEPROM, and the BIOS includes a basic routine helping transport of information among the constituent elements within the computing device 1602 at a time, such as starting. The RAM 1612 may also include a high-rate RAM, such as a static RAM, for caching data.

The computing device 1602 also includes an embedded hard disk drive (HDD) 1614 (for example, enhanced integrated drive electronics (EIDE) and serial advanced technology attachment (SATA))—the embedded HDD 1614 being configured for outer mounted usage within a proper chassis (not illustrated)—a magnetic floppy disk drive (FDD) 1616 (for example, which is for reading data from a portable diskette 1618 or recording data in the portable diskette 1618), and an optical disk drive 1620 (for example, which is for reading a CD-ROM disk 1622, or reading data from other high-capacity optical media, such as a DVD, or recording data in the high-capacity optical media). The hard disk drive 1614, the magnetic disk drive 1616, and the optical disk drive 1620 may be connected to a system bus 1608 by a hard disk drive interface 1624, a magnetic disk drive interface 1620, and an optical drive interface 1628, respectively. An interface 1624 for implementing an outer mounted drive includes at least one of or both a universal serial bus (USB) and the Institute of Electrical and Electronics Engineers (IEEE) 1394 interface technology.

The drives and the computer-readable storage medium related to the drives stores data, a data structure, a computer executable command, and the like in a non-volatile manner. In the case of the computing device 1602, the drive and the medium correspond to the storage of predetermined data in an appropriate digital form. In the description of the computer-readable storage media, the HDD, the portable magnetic disk, and the portable optical media, such as a CD, or a DVD, are mentioned, but those skilled in the art will appreciate well that other types of compute readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operating system 1630, one or more application programs 1632, other program modules 1634, and program data 1636 may be stored in the drive and the RAM 1612. An entirety or a part of the operation system, the application, the module, and/or data may also be cached in the RAM 1612. Those skilled in the art will appreciate well that the present disclosure may be implemented by several commercially available operating systems or a combination of the operating systems.

A user may input a command and information to the computing device 1602 through one or more wired/wireless input devices, for example, a keyboard 1638 and a pointing device, such as a mouse 1640. Other input devices (not illustrated) may be a microphone, an IR remote controller, a joystick, a gamepad, a stylus pen, a touch screen, and the like. The foregoing and other input devices are frequently connected to the processing device 1604 through an input device interface 1642 connected to the system bus 1608, but maybe connected by other interfaces, such as a parallel port, an IEEE 1394 serial port, a game port, a USB port, an IR interface, and other interfaces.

A monitor 1644 or other types of display devices are also connected to the system bus 1608 through an interface, such as a video adapter 1646. In addition to the monitor 1644, the computer generally includes other peripheral output devices (not illustrated), such as a speaker and a printer.

The computing device 1602 may be operated in a networked environment by using a logical connection to one or more remote computers, such as remote computer(s) 1648, through wired and/or wireless communication. The remote computer(s) 1648 may be a workstation, a server computer, a router, a personal computer, a portable computer, a microprocessor-based entertainment device, a peer device, and other general network nodes, and generally includes a plurality of or an entirety of the constituent elements described for the computing device 1602, but only a memory storage device 1650 is illustrated for simplicity. The illustrated logical connection includes a wired/wireless connection to a local area network (LAN) 1652 and/or a larger network, for example, a wide area network (WAN) 1654. The LAN and WAN networking environments are generally in an office and a company and make an enterprise-wide computer network, such as an Intranet, easy, and all of the LAN and WAN networking environments may be connected to a worldwide computer network, for example, Internet.

When the computing device 1602 is used in the LAN networking environment, the computing device 1602 is connected to the local network 1652 through a wired and/or wireless communication network interface or an adapter 1656. The adapter 1656 may make wired or wireless communication to the LAN 1652 easy, and the LAN 1652 also includes a wireless access point installed therein for the communication with the wireless adapter 1656. When the computing device 1602 is used in the WAN networking environment, the computing device 1602 may include a modem 1658, is connected to a communication server on a WAN 1654, or includes other means setting communication through the WAN 1654 via the Internet. The modem 1658, which may be an embedded or outer-mounted and wired or wireless device, is connected to the system bus 1608 through a serial port interface 1642. In the networked environment, the program modules described for the computing device 1602 or some of the program modules may be stored in a remote memory/storage device 1650. The illustrated network connection is illustrative, and those skilled in the art will appreciate well that other means setting a communication link between the computers may be used.

The computing device 1602 operates communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or maybe simply ad hoc communication between at least two devices.

The Wi-Fi enables a connection to the Internet and the like even without a wire. Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.6 (a, b, g, etc.) for providing a safe, reliable, and high-rate wireless connection. The Wi-Fi maybe used for connecting to the computer, the Internet, and the wired network (IEEE 802.3 or Ethernet is used). The Wi-Fi network may be operated at, for example, a data rate of 6 Mbps (802.6a) or 54 Mbps (802.6b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described the exemplary embodiments disclosed herein may be implemented by electronic hardware (for convenience, called "software" herein), various forms of program or design code, or a combination thereof. To clearly describe the compatibility of the hardware and the software, various illustrative components, blocks, modules, circuits, and operations are generally illustrated above concerning the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. The term "machine-readable medium" includes various medium capable of storing and holding command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

The invention claimed is:

1. A non-transitory computer readable medium storing a computer program, wherein when the computer program is executed by one or more processors of a computing system, the computer program causes the one or more processors of the computer system to perform a method for generating and utilizing a virtual fingerprint representing text data, wherein the method comprises:

dividing the text data into one or more segments based on a predetermined text segmentation algorithm;

determining a mapping value assigned to one or more subsegments that form a segment based on a predetermined mapping algorithm;

generating a coordinate value for each of the one or more segments based on the determined mapping value;

generating the virtual fingerprint having a phonetic feature for the text data based on the generated coordinate value;

generating a labeled training data comprising a similarity result data for two or more text data and data for virtual fingerprints having a phonetic feature generated corresponding to the two or more text data; and training a deep neural network by using the labeled training data.

2. The non-transitory computer readable medium according to claim 1, wherein the generating the virtual fingerprint having a phonetic feature comprises:

determining points in N-dimension space based on coordinate values generated for each of the one or more segments; and generating the virtual fingerprint having the phonetic feature for the text data by connecting the determined points.

3. The non-transitory computer readable medium according to claim 2, wherein the generating the virtual fingerprint having the phonetic feature further comprises:

determining a size of a dimension for representing the virtual fingerprint having the phonetic feature based on a size value of a segment divided from the text data by the text segmentation algorithm.

4. The non-transitory computer readable medium according to claim 2, wherein a first dimension to an (N−1)th dimension among the N-dimension space corresponds to an N−1 dimension coordinate value assigned to subsegments of the segment, and an Nth dimension among the N-dimension space corresponds to a one-dimension coordinate value assigned with the divided segment as a unit.

5. The non-transitory computer readable medium according to claim 2, wherein the generating the virtual fingerprint having a phonetic feature comprises:

generating the virtual fingerprint having the phonetic feature by differently indicating connections between points corresponding to coordinate values of the segments, based on order information of the segments divided from the text data.

6. The non-transitory computer readable medium according to claim 2, wherein the generating the virtual fingerprint having the phonetic feature comprises at least one of:

generating the virtual fingerprint having the phonetic feature by gradually changing at least one of thickness or color intensity of a connection line that connects the determined points, based on at least one of thickness or color intensity determined for the determined points; or generating the virtual fingerprint having the phonetic feature by differently indicating the color intensity of a center of the connection line that connects the points and the color intensity of a periphery of the connection line that connects the points.

7. The non-transitory computer readable medium according to claim 5, wherein the generating the virtual fingerprint having the phonetic feature comprises:

generating the virtual fingerprint having the phonetic feature by indicating connections between the segments by applying a higher weight to a connection line between segments with a preceding order, than a connection line between segments with a succeeding order, based on order information of the segments divided from the text data.

8. The non-transitory computer readable medium according to claim 7, wherein the indicating the connections between the segments comprises at least one of:
    indicating thickness of a connection line with a higher weight to have more thickness than thickness of a connection line with a lower weight; or
    indicating color intensity of a connection line with a higher weight to have more color intensity than color intensity of a connection line with a lower weight, and wherein at least one of a value of the thickness or a value of the color intensity is determined based on length information of the text data.

9. The non-transitory computer readable medium according to claim 5, wherein the generating the virtual fingerprint having the phonetic feature comprises:
    generating the virtual fingerprint having the phonetic feature by indicating connections between the segments by applying a weight to a connection line between segments with the most preceding order, based on order information of the segments divided from the text data.

10. The non-transitory computer readable medium according to claim 1, wherein the predetermined segmentation algorithm determines as a unit of a segmentation the number of subsegments that one segment divided from the text data has, wherein the predetermined segmentation algorithm adds a start subsegment before an initial segment of the text data, and adds an end subsegment after a final subsegment, and wherein the predetermined segmentation algorithm divides the text data into segments by forming M subsegments comprising the start subsegment and the end subsegment into one segment.

11. The non-transitory computer readable medium according to claim 1, wherein the predetermined mapping algorithm assigns a unique mapping value per a subsegment as a unit or per a combination of subsegments as a unit, based on a pronunciation form of letters constituting a language to which the text data belongs, and wherein the predetermined mapping algorithm further assigns the unique mapping value to a start subsegment added before an initial subsegment of the text data and an end subsegment added after a final subsegment.

12. The non-transitory computer readable medium according to claim 11, wherein the predetermined mapping algorithm further:
    sets a difference between mapping values of subsegments corresponding to the letters to have a first difference value, when a similarity level of a pronunciation falls inside a predetermined range; and
    sets a difference between mapping values of subsegments corresponding to the letters to have a second difference value, when a similarity level of a pronunciation falls outside a predetermined range; and
    wherein the first difference value is smaller than the second difference value.

13. The non-transitory computer readable medium according to claim 1, wherein the method further comprises:
    generating a plurality of text data by dividing a sentence data with a pronunciation as a unit or with a semantic as a unit based on a sentence segmentation algorithm, when the sentence data is received; and
    transforming the sentence data into a virtual fingerprint having N channels, by stacking virtual fingerprints having a phonetic feature generated corresponding to the plurality of text data, on N-dimension.

14. The non-transitory computer readable medium according to claim 1, wherein the method further comprises:
    comparing virtual fingerprints having a phonetic feature generated for each of a plurality of text data, by concatenating a first virtual fingerprint having a phonetic feature for a first text data of the plurality of text data with a second virtual fingerprint having a phonetic feature for a second text data of the plurality of text data and by using the concatenated virtual fingerprint; and
    determining a pronunciation similarity level of the plurality of text data based on a comparison result.

15. The non-transitory computer readable medium according to claim 14, wherein the comparing the virtual fingerprints having the phonetic feature comprises:
    applying a first color of R (Red), G (Green) or B (Blue) to the first virtual fingerprint having the phonetic feature for the first text data of the plurality of text data;
    applying a second color of R, G or B to the second virtual fingerprint having the phonetic feature for the second text data of the plurality of text data, wherein the first color is different from the second color; and
    comparing the virtual fingerprints having the phonetic feature, based on at least one of a color intensity or a color weight, by concatenating the first virtual fingerprint and the second virtual fingerprint to which a color is applied.

16. The non-transitory computer readable medium according to claim 14, wherein the comparing the virtual fingerprints having the phonetic feature comprises:
    comparing the virtual fingerprints based on a pixel value included in the virtual fingerprint, wherein the comparing the virtual fingerprints having the phonetic feature comprises at least one of:
    calculating Euclidean distance value between the first virtual fingerprint having the phonetic feature for the first text data of the plurality of text data and the second virtual fingerprint having the phonetic feature for the second text data of the plurality of text data; or
    calculating Cosine distance value between the first virtual fingerprint and the second virtual fingerprint.

17. The non-transitory computer readable medium according to claim 1, wherein the method further comprises:
    after training the deep neural network,
    receiving an input for two or more text data;
    generating virtual fingerprints having phonetic features for the two or more text data;
    determining information related to the result of the comparison for the generated virtual fingerprints having the phonetic features, by a network function of a trained deep neural network; and
    determining to output the information related to the result of the comparison determined by the network function.

18. A computing apparatus for implementing a method for generating and utilizing a text fingerprint comprising:
    one or more processors; and
    a memory storing instructions executable by the one or more processors;
    wherein the one or more processors are configured to:
    divide text data into one or more segments based on a predetermined text segmentation algorithm;
    determine a mapping value assigned to one or more subsegments that form a segment based on a predetermined mapping algorithm;

generate a coordinate value for each of the one or more segments based on the determined mapping value;

generate a virtual fingerprint having a phonetic feature for the text data based on the generated coordinate value;

generate a labeled training data comprising a similarity result data for two or more text data and data for virtual fingerprints having a phonetic feature generated corresponding to the two or more text data; and train a deep neural network by using the labeled training data.

19. A method for generating and utilizing a text fingerprint comprising:

dividing text data into one or more segments based on a predetermined text segmentation algorithm;

determining a mapping value assigned to one or more subsegments that form a segment based on a predetermined mapping algorithm;

generating a coordinate value for each of the one or more segments based on the determined mapping value;

generating the virtual fingerprint having a phonetic feature for the text data based on the generated coordinate value;

generating a labeled training data comprising a similarity result data for two or more text data and data for virtual fingerprints having a phonetic feature generated corresponding to the two or more text data; and training a deep neural network by using the labeled training data.

* * * * *